US012748391B2

(12) United States Patent
Zimmermann et al.

(10) Patent No.: US 12,748,391 B2
(45) Date of Patent: Sep. 29, 2026

(54) METHOD AND SYSTEM FOR PROCESSING INPUT VALUES

(71) Applicants: FRAUNHOFFER-GESELLSCHAFT ZUR FÖRDERUNG DER ANGEWANDTEN FORSCHUNG E.V., Munich (DE); Universität Des Saarlandes, Saarbrücken (DE)

(72) Inventors: Heiko Zimmermann, Sulzbach (DE); Günter Fuhr, Berlin (DE); Antonie Fuhr, Berlin (DE)

( * ) Notice: Subject to any disclaimer, the term of this patent is extended or adjusted under 35 U.S.C. 154(b) by 602 days.

(21) Appl. No.: 18/037,626

(22) PCT Filed: Nov. 19, 2021

(86) PCT No.: PCT/EP2021/082350
§ 371 (c)(1),
(2) Date: May 18, 2023

(87) PCT Pub. No.: WO2022/106645
PCT Pub. Date: May 27, 2022

(65) Prior Publication Data

US 2024/0027977 A1 Jan. 25, 2024

(30) Foreign Application Priority Data

Nov. 19, 2020 (DE) ......................... 102020130604.0

(51) Int. Cl.
*G05B 13/02* (2006.01)
*G05B 13/04* (2006.01)
*G06Q 10/0637* (2023.01)

(52) U.S. Cl.
CPC ......... *G05B 13/027* (2013.01); *G05B 13/042* (2013.01); *G06Q 10/0637* (2013.01)

(58) Field of Classification Search
CPC .... B60W 30/00; F02D 41/1405; F03D 7/046; G01C 21/3602; G05B 2219/25255;
(Continued)

(56) References Cited

U.S. PATENT DOCUMENTS 9,015,093 B1 4/2015 Commons
2016/0117587 A1* 4/2016 Yan ...................... G06N 3/0464 706/20

(Continued)

FOREIGN PATENT DOCUMENTS

GB 2336227 A 10/1999
WO 2018220566 A1 12/2018
WO 2020233851 A1 11/2020

OTHER PUBLICATIONS

Yan et al, HD-CNN: Hierarchical Deep Convolutional Neural Networks for Large Scale Visual Recognition, 2015, IEEE, 2015 IEEE International Conference on Computer Vision, 2740-2748 (Year: 2015).*

(Continued)

*Primary Examiner* — Tameem D Siddiquee
(74) *Attorney, Agent, or Firm* — Lippes Mathias LLP

(57) ABSTRACT

The invention relates to a method implemented in a control system of a machine for processing input values in an overall system with a working level and an evaluation level comprising inputting first input values to the working level and determining first output values; forming first situation data; inputting the first situation data to the evaluation level and determining first evaluations indicating whether the first situation data satisfy predetermined first conditions; influencing the determination of the first output values based on the first evaluations; inputting second input values to the working level and determining second output values, wherein the deter- (Continued)

mination of the second output values is influenced by the first output values; forming second situation data; inputting the second situation data to the evaluation level and determining second evaluations indicating whether the second situation data satisfy predetermined second conditions, the determining of the second evaluations being influenced by the first evaluations; influencing the determining of the second output values based on the second evaluations; wherein the first and/or the second output values are used as overall output values of the overall system.

25 Claims, 8 Drawing Sheets

(58) Field of Classification Search
CPC ........ G05B 2219/41054; G05B 13/027; G05B 13/042; G05B 19/0426; G06N 3/00; G06N 3/02; G06N 3/04; G06N 3/042; G06N 3/0442; G06N 3/045; G06N 3/0455; G06N 3/0499; G06N 3/08; G06N 3/082; G06N 3/0895; G06N 3/09; G06N 3/091; G06N 3/092; G06N 3/096; G06N 3/0985; G06N 7/046; G06N 3/048; G06N 3/084; Y10S 128/925; G06Q 10/0637; G06Q 50/04
See application file for complete search history.

(56) References Cited

U.S. PATENT DOCUMENTS

| | | | | |
|---|---|---|---|---|
| 2020/0372332 | A1* | 11/2020 | Kimura | G06N 3/045 |
| 2021/0034986 | A1* | 2/2021 | House | G06N 3/09 |
| 2021/0382495 | A1* | 12/2021 | Hoyer | G01S 17/931 |
| 2022/0292331 | A1 | 9/2022 | Zimmermann et al. | |
| 2022/0343165 | A1* | 10/2022 | Hu | G06F 9/4806 |

OTHER PUBLICATIONS

Wikipedia [EN], Long short-term memory. Stand: Oct. 11, 2020. URL:https://en.wikipedia.org/w/index.php?title=Long_short-term_memory&oldid=987978443 [abgerufen am Dec. 7, 2021].
Lewis, Frank L.; VRABIE, Draguna. Reinforcement learning and adaptive dynamic programming for feedback control. IEEE circuits and systems magazine, 2009, 9. Jg., Nr. 3, S. 32-50. DOI: https://doi.org/10.1109/MCAS.2009.933854.
International Search Report for Patent Application No. PCT/EP2021/082350, 4 pages.

* cited by examiner

METHOD AND SYSTEM FOR PROCESSING INPUT VALUES

The present invention relates to an overall system comprising a working level and an evaluation level which are artificial learning systems, in particular a method implemented therein for processing input values in a control system of a machine.

STATE OF THE ART

Artificial intelligence now plays an increasing role in countless areas of application. This is initially understood to mean any automation of intelligent behaviour and machine learning. However, such systems are usually intended and trained for special tasks. This form of artificial intelligence (AI) is often referred to as "weak AI" and is essentially based on the application of calculations and algorithms to simulate intelligent behaviour in a fixed area. Examples include systems that are able to recognise certain patterns, such as safety systems in vehicles, or that can learn and implement certain rules, such as in chess. At the same time, these systems are essentially useless in other areas and have to be completely retrained for other applications or even trained using completely different approaches.

Neural networks, among other things, are used for the practical implementation of such artificial/artificially learning units. In principle, these networks replicate the functioning of biological neurons on an abstract level. There are several artificial neurons or nodes that are connected to each other and can receive, process and transmit signals to other nodes. For each node, functions, weightings and threshold values are then defined, for example, which determine whether and in what strength a signal is passed on to a node.

Usually, the nodes are considered in layers, so that each neural network has at least one output layer. Before that, further layers can be present as so-called hidden layers, so that a multi-layer network is formed. The input values or features can also be considered as layers. The connections between the nodes of the different layers are called edges, and these are usually assigned a fixed processing direction. Depending on the network topology, it may be specified which node of a layer is linked to which node of the following layer. In this case, all nodes can be connected, but, for example, a learned weighting with the value 0 means that a signal cannot be processed further via a specific node.

The processing of signals in the neural network can be described by various functions. In the following, this principle is described for a single neuron or node of a neural network. From the several different input values that reach a node, a network input is formed by a propagation function (also input function). Often, this propagation function comprises a simple weighted sum, whereby an associated weighting is specified for each input value. In principle, however, other propagation functions are also possible. The weights can be specified as a weight matrix for the network.

An activation function, which can be dependent on a threshold value, is applied to the network input of a node formed in this way. This function represents the relationship between the network input and the activity level of a neuron. Various activation functions are known, for example simple binary threshold functions whose output is thus zero below the threshold and identity above the threshold; sigmoid functions; or piecewise linear functions with a given slope. These functions are specified when designing a neural network. The result of the activation function forms the activation state. Optionally, an additional output function may be specified, which is applied to the output of the activation function and determines the final output value of the node. Often, however, the result of the activation function is simply passed on directly as the output value, i.e. the identity is used as the output function. Depending on the nomenclature used, the activation function and the output function can also be combined as a transfer function.

The output values of each node are then passed on to the next layer of the neural network as input values for the respective nodes of the layer, where the corresponding steps are repeated for processing with the respective functions and weights of the node. Depending on the topology of the network, there may also be backward edges to previous layers or back into the output layer, resulting in a recurrent network.

The weights with which the input values are each weighted, on the other hand, can be changed by the network and thus adjust the output values and functioning of the entire network, which is considered the "learning" of a neural network. For this purpose, error backpropagation is usually used in the network, i.e. a comparison of the output values with expected values and use of the comparison to adapt the input values with the aim of minimising errors. Through error feedback, various parameters of the network can then be adjusted accordingly, for example the step size (learning rate) or the weights of the input values at the nodes. Likewise, the input values can also be re-evaluated.

The networks can then be trained in a training mode. The learning strategies used are also decisive for the possible applications of a neural network. In particular, the following variants are distinguished:

In supervised learning, an input pattern or training data set is given and the output of the network is compared with the expected value.

Unsupervised learning leaves the finding of correlations or rules to the system, so that only the patterns to be learned are specified. An intermediate variant is semi-supervised learning, in which data sets without predefined classifications can also be used.

In reinforced learning or Q-learning, an agent is created that can receive rewards and punishments for actions and, based on this, tries to maximise the rewards received and thus adapt its behaviour.

An important application of neural networks is the classification of input data or inputs into certain categories or classes, i.e. the recognition of correlations and assignments. The classes can be trained on the basis of known data and be at least partially predefined, or they can be developed or learned independently by a network.

The basic functioning and further specific details of such neural networks are known in the subject, for example from R. Schwaiger, J. Steinwender, Neuronale Netze programmieren mit Python, Rheinwerk Computing, Bonn 2019.

A universally applicable AI system that is not trained for just one special task would lead to multi- or high-dimensional spaces and thus require exponentially increasing training and test data sets. Real-time responses thus quickly become impossible. Therefore, attempts are generally made to reduce the dimensionality and complexity of such systems. Different approaches to solving this problem are being pursued. For example, the complexity can be reduced by linking data sets, reducing the degrees of freedom and/or by feeding known knowledge into a system. Another approach is to at least partially separate correlated data or interdependent data sets, for example by using methods such as Principal Component Analysis. By applying filtering methods to the features, data can be eliminated that do not stand out or stand out negatively when training a network, e.g. by applying statistical tests such as the chi-square test or others. Finally, the selection of the training data itself can be done as an optimisation problem in an AI network. In this case, the training data are combined in such a way that they can train a new network as quickly and well as possible.

More advanced approaches include so-called "Convolutional Neural Networks", which apply convolutions in at least one layer of a multilayer fully connected network instead of simple matrix transformations. For example, the so-called "deep-dream" method is known, especially in the field of image recognition, in which the weights in a trained network are left optimal, but instead the input values (e.g. an input image) are modified as a feedback loop depending on the output value. In this way, for example, what the system believes to identify is faded in. The name refers to the fact that dream-like images are created in the process. In this way, internal processes of the neural network and their direction can be traced.

It is obvious that these methods still show great differences to human intelligence. Although the databases, text files, images and audio files can in principle be compared to how facts, language, speech logic, sounds, images and event sequences are also stored and processed in the brain, human intelligence differs significantly, for example, in that it links all this data in the context of feelings and unconscious "soft" categorisations.

Disclosure of the Invention

According to the invention, a method, which is carried out in a control system of a machine, for processing input values in an overall system which has a working level and an evaluation level, which are artificial learning systems, and a corresponding system having the features of the independent claims are proposed. Advantageous embodiments are the subject of the dependent claims and the following description.

The method (or methods, as the case may be) carried out in a control system of a machine for processing input values comprising sensor data (or values or measured values, as the case may be) detected by one or more sensors in an overall system having a working level and an evaluation level, which are artificial learning systems, comprises

- a) Inputting first input values to the working level and determining first output values from the first input values by the working level, according to a first classification;
- b) Forming first situation data based on the first output values;
- c) Inputting the initial situation data to the evaluation level and determining initial assessments by the evaluation level indicating whether or to what degree the initial situation data meets predetermined initial conditions;
- d) Influence the determination of the first output values in the working level based on the first evaluations;

whereby steps a)-d) are carried out repeatedly;

- e) inputting second input values to the working level and determining second output values from the second input values by the working level, according to a second classification, wherein the determination of the second output values is influenced by the first output values;
- f) Forming second situation data based on the second output values;
- g) inputting the second situation data to the evaluation level and determining second assessments by the evaluation level indicating whether or to what degree the second situation data satisfies predetermined second conditions, the determination of the second assessments being influenced by the first assessments;
- h) Influencing the determination of the second output values in the working level based on the second evaluations;

whereby steps e)-h) are carried out repeatedly;

wherein the first and/or the second output values are used as overall output values of the overall system, wherein the overall output values are used as control parameters and/or state parameters of the machine.

In particular, "artificial learning systems" within the meaning of this application may comprise two (or more) artificial learning units coupled to each other, cf. the description of FIGS. 1 to 6. An "artificial learning unit" may be considered as a unit implementing a machine learning based algorithm, e.g. an artificial neural network. A machine learning based algorithm can be trained using training data to build a model to make predictions or decisions based on input values, which are output in the form of output values. The artificial learning units of the working level and evaluation level can respectively be trained to obtain the first/second output values from the first/second input values and the first/second evaluations from the first/second situation data. The coupling of the artificial learning units within an artificial learning system is in particular implemented in such a way that the first unit or its output values influences the second unit or its processing of input values, but the second unit does not influence the first unit.

Artificial learning systems or units can be implemented as computer programs that are executed in computing units (e.g. processors, computers, server systems or accelerator cards). The artificial learning systems or units can also be implemented at least partially as hardware, for example as an FPGA (Field Programmable Gate Array). In particular, it is also possible to implement the artificial learning systems by means of interconnected artificial learning units that can also be executed in different computing units.

The machine may be, for example, an industrial machine, an industrial plant (system of interacting machines), a mobile working machine, and/or a vehicle, in particular an autonomous or semi-autonomous vehicle. The control system may comprise one or more control units or computing units (e.g. in one or more control units of the machine). In particular, it may be envisaged that the working level and the evaluation level are implemented in different computing units (e.g. different control units) that are separate from each other. Each control unit or computing units may comprise one or more processors, volatile memory, non-volatile memory, communication interfaces (for data communication with sensors, with machine components, with other control units, or with external devices) and/or the like. Hardware accelerator elements (AI accelerators, for accele-evaluation computing steps of the artificial learning systems or artificial learning units) can also be provided in the control units. In the non-volatile memory, in particular, programs with which the method is implemented and/or data that accrue during the implementation of the method can be or are stored.

On the one hand, sensors (preferably mounted on the machine) can be provided that determine or measure properties or variables of the machine or components of the machine, e.g. pressure sensors (e.g. to determine the pressure of a hydraulic fluid), current and/or voltage sensors (e.g.

on electrically operated actuators or electric motors/generators), temperature sensors, speed sensors, rotational speed sensors, light sensors, position sensors, sensors that determine the position of actuators, or the like. On the other hand, additionally or alternatively, sensors (preferably on the machine) can be provided that determine or measure properties or quantities that affect the environment of the machine, e.g. cameras, radar, lidar or infrared sensors, microphones or the like. In addition to sensor data, the input values may also include other data or values, e.g. user inputs, data transmitted from other devices, requests or specifications, previous values of the control parameters or state parameters, or similar.

The term "control parameters" is intended to refer to parameters or quantities used to control the machine, e.g. parameters/quantities based on which components of the machine are controlled. The term "state parameters" refers to parameters that indicate a state of the machine, e.g. which of a variety of possible opeevaluation states exists, whether a danger state exists, or whether the machine is functioning correctly or whether a fault state exists.

The influencing of the determination of the first or second output values (step d) or h)) by the first or second evaluations refers to the respective next repetition of the determination of first or second output values from the first or second input values, i.e. to the next repetition of steps a)-d) or e)-h). In the first repetition, in particular, the determination of the first or second output values is not yet influenced. This can be realised, for example, by initialising with neutral first or second evaluations.

The input values can remain constant during the repetitions of steps a)-d) or e)-h) or can be variable, whereby the simultaneous use of both is also possible. For example, sensor data (measured values) determined at a relatively high rate may change at least slightly during the repetitions, e.g. of a current intensity, voltage, temperature or speed sensor. In case of large changes, e.g. larger than predetermined thresholds, the presence of a new situation can be assumed (if a new situation is present, the first output values can first be used as total output values and then, e.g. after a certain time or if another condition is fulfilled, the second output values can be used as total output values). Other sensor data may again remain constant, e.g. of a camera, evaluating captured images captured at a relatively low rate (such as 30, 60 or <100 Hz). In this case, a (first/second) time span that is maximally available for the repetitions can be selected according to this low rate. For example, if images are captured at a frequency of 30 Hz, which corresponds to a time interval between two successive images of approximately 33 ms, the time span can be chosen to be smaller than 33 ms, e.g. 30 ms, so that a newly captured image is evaluated in each time span. If data acquired simultaneously at a higher frequency are used as input values, these may change during this time span (e.g. 30 ms). Here it is assumed that this change is relatively small, so that no fundamentally new situation arises.

In particular, the input values can also be time-dependent, for example, the input values could be time series of sampled signals. It is therefore possible that the input values input to the second working unit differ (in their current) from the input values (previously) input to the first working unit due to such time dependency, or that in the further course of the method, when the input values are repeatedly used by one working unit, this one working unit processes different current input values. For simplicity, however, reference is always made to "input values" without explicitly mentioning any time dependency.

The first or second conditions can be of a purely technical nature. For example, if the method is used in a machine control system and the total output values represent control parameters, e.g. for a motor, one condition could be that the control parameters must lie within technically specified ranges, e.g. below a maximum speed of the controlled motor.

In particular, the conditions can also be, at least in part, of a non-technical nature. This can concern moral-ethical aspects or economic aspects.

Moral-ethical aspects are relevant, for example, for an autonomous vehicle in which an artificial learning system is used as a control system. For example, if this control system determines, e.g. on the basis of camera images or lidar images captured by the autonomous vehicle and evaluated by the control system, that a collision with another vehicle can no longer be avoided even with full braking without steering correction, it will determine various possible steering corrections with which the collision can be avoided. For example, one possible steering correction could lead to endangering a pedestrian, while another possible steering correction could lead to a collision with a wall. One of the first conditions could be that human life should not be directly endangered, due to this condition the steering movement leading to the endangerment of the pedestrian can be excluded or suppressed relative to the other solutions. Such a basic evaluation can result in the interaction of the first output values with the first evaluations. Moral-ethical aspects can also play a role in the two remaining options in this example (no steering correction and collision with the other vehicle; steering correction and collision with the wall), since e.g. endangering other vehicles and their occupants should be avoided. This would be a possible second condition in this example, e.g. for the more detailed analysis on which the second output values are based. In this example, the first condition represents an absolute consideration, while the second condition represents a relative consideration.

Such moral-ethical or economic considerations can be codified in an appropriate way as conditions; e.g. as contracts that carry out certain trade-offs in the form of automatically running programmes. In this sense, conditions constitute moral contracts, so to speak.

The conditions are "normative codes", i.e. rules to be striven for but not achievable in every case. The conditions are therefore not absolute conditions that must be met in every case. Accordingly, the overall output is determined by the working level, whereby by influencing the working level through the evaluation level for respective input values, the overall output is determined in such a way that the conditions are observed as best as possible.

The invention thus makes it possible to take into account aspects which are not of a directly technical nature in technical systems which are controlled or monitored by a method according to the invention for processing input values.

An example of economic considerations would be the use of the system in a machine control in a production plant, on the one hand as much product as possible should be produced as quickly as possible (i.e. high revenues should be generated), but on the other hand this leads to higher wear. So in principle this is a mixture of economic and technical considerations.

Preferably, steps a)-d) are performed repeatedly until a predetermined first time period has elapsed and/or the first output values no longer change between successive repetitions within predetermined first tolerances and/or the first evaluations indicate that the first conditions have been met at least to some degree; preferably, the first output values are used as total output values when this repeated performance is completed.

Preferably, steps e)-h) are performed repeatedly until a predetermined second time period has elapsed and/or the second output values no longer change between successive repetitions within predetermined second tolerances and/or the second evaluations indicate that the second conditions have been met at least to some degree; preferably, the second output values are used as total output values when this repeated performance is completed.

Preferably, the method comprises storing, in an overall or total sequence memory, total sequences of total records each comprising mutually corresponding input values and/or first output values and/or first situation data and/or first evaluations and/or second output values and/or second situation data and/or second evaluations; wherein preferably the total records and/or the values or data comprised in the total records are provided with respective time information and/or numbering.

Preferably, the method comprises supplementing the first and/or second conditions such that for first and second situation data, respectively, for which the first and second conditions, respectively, are not satisfied prior to the supplementation, the supplemented first and second conditions, respectively, are satisfied or at least to some degree satisfied; wherein preferably only the second conditions are changed and the first conditions remain unchanged.

Preferably, when the repetition of steps e)-h) is aborted because the second time period has elapsed or, further preferably, because the second output values no longer change within the second tolerances, the second conditions are supplemented so that the situation data present at abort satisfy the supplemented second conditions.

Preferably, the completion or supplementing of the first and/or second conditions is based on stored total sequences for which the first or second conditions could not be fulfilled (or not to a certain degree).

Preferably, the overall system comprises a projection level, wherein the formation of the first and/or the second situation data is performed by the projection level.

Preferably, the second classification classifies at least one class of the first classification into a plurality of subclasses and/or, for at least one of the first conditions, that one first condition is implied by a plurality of the second conditions.

Preferably, the first conditions are given in the form of rules and the second conditions are given in the form of rule classifications; wherein each rule is assigned a rule classification which represents a subdivision, in particular into several levels, of the respective rule; wherein preferably memories are provided in which the rules and the rule classifications are stored; wherein further preferably the rule classifications are subdivided into levels which are linked by means of a blockchain, wherein the rules and/or rule classifications are implemented in each case in the form of a smart contract and/or wherein, if necessary, a further level of the subdivision is added when supplementing the second conditions.

The working level is preferably designed in such a way that the determination of the first output values in step a) requires a shorter period of time and the determination of the second output values in step e) requires a longer period of time; and/or wherein the evaluation level is designed in such a way that the determination of the first evaluations in step c) requires a shorter period of time and the determination of the second evaluations in step g) requires a longer period of time; wherein in both cases in each case the longer period of time is preferably longer than the shorter period of time by at least a factor of 2, in particular by at least a factor of 5.

Preferably, the first and second input values are given as continuous-time input signals or as discrete-time time series, and further preferably the first and second input values are wholly or partially identical.

The working level preferably comprises a first and a second artificial learning working unit; wherein the first artificial learning working unit is arranged to receive the first input values and to determine the first output values; wherein the second artificial learning working unit is arranged to receive the second input values and to determine the second output values; and wherein, in the working level, one or more first modulation functions are formed based on the first output values and/or values derived therefrom, the formed one or more first modulation functions being applied to one or more parameters of the second artificial learning working unit, the one or more parameters affecting the processing of input values and the obtaining of output values in the second artificial learning working unit.

In the simplest case, situation data can be, for example, the respective output values themselves. First and second situation data can be formed depending on the dominance within the working level formed by the first and second working unit. I.e. if the first work unit dominates, first situation data is formed on the basis of at least the first output values of the first work unit (e.g. the output values of the first work unit and/or values derived therefrom are used as situation data); on the other hand, if the second work unit dominates, second situation data is formed on the basis of at least the second work unit (e.g. the output values of the second work unit and/or values derived therefrom are used as situation data).

Preferably, the first evaluations and/or values derived therefrom are used as evaluation input values of the first artificial learning working unit; and/or that one or more second modulation functions are formed based on the first evaluations and/or values derived therefrom, the formed one or more second modulation functions being applied to one or more parameters of the first artificial learning work unit, the one or more parameters influencing the processing of input values and the obtaining of output values in the first artificial learning work unit; and/or that the second evaluations and/or values derived therefrom are used as evaluation input values of the second artificial learning work unit.

The evaluation input values are a part of the input values and are additional input values to the input values to be analysed, so that the first output values can be changed accordingly. Before the first execution of step a) and if the input values change significantly, indicating that there is a new situation, the first evaluations can be initialised to indicate that all first conditions are met.

The evaluation layer preferably comprises a first and a second artificial learning evaluation unit; wherein the first artificial learning evaluation unit is arranged to receive the first situation data and to determine the first evaluations; wherein the second artificial learning evaluation unit is arranged to receive the second situation data and to determine the second evaluations; and wherein, in the evaluation layer, one or more third modulation functions are formed based on the first evaluations and/or values derived therefrom, the formed one or more second modulation functions being applied to one or more parameters of the second artificial learning evaluation unit, the one or more parameters influencing the processing of input values and the obtaining of output values in the second artificial learning evaluation unit.

The method preferably comprises storing, in a first sequence memory, a first evaluation sequence of first evaluation sets comprising input values of the first evaluation unit and associated first evaluations, the first evaluation sets being provided in particular with respective time information and/or a numbering; and/or storing, in a second sequence memory, a second evaluation sequence of second evaluation records which comprise input values of the second evaluation unit and associated second evaluations, the second evaluation records being provided in particular with respective time information and/or a numbering; the first and/or the second evaluations being further preferably determined taking into account the stored first or second evaluation sequences.

Saving the first/second evaluation sequences makes it possible to track the "decisions" of the evaluation units and, if necessary, for example if they do not work as desired, to carry out further training using the evaluation sequences.

Preferably, the storage is carried out in cryptographically secured form; whereby preferably one blockchain is used in each case, whereby blocks of the respective blockchain contain at least one of the first valuation records, the second valuation records or the total records.

Preferably, the method comprises: receiving output values from another system; forming first and/or second situation data from the received output values; determining first and/or second evaluations by the evaluation level based on the first and second situation data, respectively, formed from the received output values; determining that the other system is compatible when the determined first and/or second evaluations indicate that the first and second conditions, respectively, are met.

Systems whose evaluation units generally test different conditions are referred to here as "compatible" if the systems do not contradict each other in their assessments, i.e. that input values (situation data) of the evaluation units which one of the systems classifies as being in accordance with its conditions are not classified by the other system as impermissible in terms of its (other) conditions, taking tolerances into account where appropriate, especially in the case of gradual assessments.

A system according to the invention comprises a working level and an evaluation level and is adapted to perform a method according to the invention; wherein the working level is adapted to receive the input values and wherein preferably the evaluation level is not able to receive the input values.

The working level and the evaluation level are preferably implemented in at least one computing unit each (as hardware and/or computer program), wherein the at least one computing unit in which the working level is implemented is further preferably different, in particular separate, from the at least one computing unit in which the evaluation level is implemented. If the respective at least one computing unit in which the working level or the evaluation level is implemented comprises several computing units, it can also be referred to as a respective computing system. The respective at least one computing units (or computing systems) are connected to each other via corresponding (wired and/or wireless) interfaces for data exchange. The working level and evaluation level can, for example, be implemented in different control devices (computing units or computing system). Different mobile radio devices are also conceivable. It is also possible that the working level is implemented by a control device (computing unit/computing system) permanently installed in the machine and the evaluation level is implemented in a mobile computing unit (e.g. mobile radio device).

The system preferably comprises a projection level and/or a total sequence memory.

Preferably, in the system, the work plane comprises a first and a second artificial learning work unit, the evaluation level comprises a first and a second artificial learning evaluation unit; wherein the artificial learning work units and/or evaluation units preferably each comprise a neural network having a plurality of nodes, wherein further preferably the one or more parameters are each at least one of: a weighting for a node of the neural network, an activation function of a node, an output function of a node, a propagation function of a node.

Preferably, a classification memory is assigned to each of the first working unit, the second working unit, the first evaluation unit and the second evaluation unit, wherein the first working unit, the second working unit, the first evaluation unit and the second evaluation unit are set up to carry out a classification of the input values or evaluations when generating the output values or evaluations. the first working unit, the second evaluation unit and the second evaluation unit being set up to classify the input values or situation data into one or more classes when generating the output values or evaluations, which classes are stored in the respective classification memory, the classes each being structured in one or more dependent levels; and a number of the classes and/or the levels in a classification memory of the first working unit and/or of the first evaluation unit preferably being smaller than a number of the classes and/or the levels in a classification memory of the second working unit, a number of the classes and/or the levels in a classification memory of the second evaluation unit further preferably being larger than the number of the classes and/or the levels in the classification memory of the first evaluation unit.

Preferably, in the system, the first and second artificial learning processing units are implemented and/or executed as hardware and/or computer programs in first and second computing units, respectively, the first and second computing units being interconnected by a first interface; optionally, the first interface being arranged to form the one or more first modulation functions. Independently thereof, preferably in the system, the first and second artificial learning evaluation units are implemented and/or executed as hardware and/or computer programs in third and fourth computing units, respectively, the third and fourth computing units being interconnected by a third interface; optionally the third interface being arranged to form the one or more third modulation functions. Preferably, the third computing unit and the first computing unit are interconnected by a second interface; optionally the second interface being arranged to form the one or more second modulation functions. The first, second, third and/or fourth computing units may be wholly or partially distinct (separate) from each other. In particular, the above-mentioned at least one computing unit in which the working level is implemented comprises the first and the second computing unit, i.e. the first and the second computing unit may be considered as a computing system in which the working level is implemented. Likewise, the above-mentioned at least one computing unit in which the evaluation level is implemented comprises in particular the third and the fourth computing unit, i.e. the. third and the fourth computing unit can be regarded as a computing system in which the evaluation level is implemented. Here it is also conceivable that the first is a (separate) computing unit different from the second and/or that the third is a (separate) computing unit different from the fourth.

Preferably, at least one, preferably all, computing units are associated with a memory which is connected to or included in the respective computing unit; wherein further preferably the memory associated with the first computing unit is arranged to store the first classification, and/or the memory associated with the second computing unit is arranged to store the second classification, and/or the memory associated with the third computing unit is arranged to store the first conditions, and/or the memory associated with the fourth computing unit is arranged to store the fourth conditions.

The system may preferably further comprise: at least one output module for outputting the first and/or second output values to a user, wherein the output module comprises at least one of: a screen, a touch screen, a speaker, a projection module.

Further advantages and embodiments of the invention are apparent from the description and the accompanying drawing.

It is understood that the features mentioned above and those to be explained below can be used not only in the combination indicated in each case, but also in other combinations or on their own, without leaving the scope of the present invention.

The invention is illustrated schematically by means of an embodiment example in the drawing and is described below with reference to the drawing.

FIGURE DESCRIPTION

FIG. 1 shows a combination of two artificially learning units coupled to one another;

FIG. 2 schematically shows various exemplary modulation functions;

Figure 1:
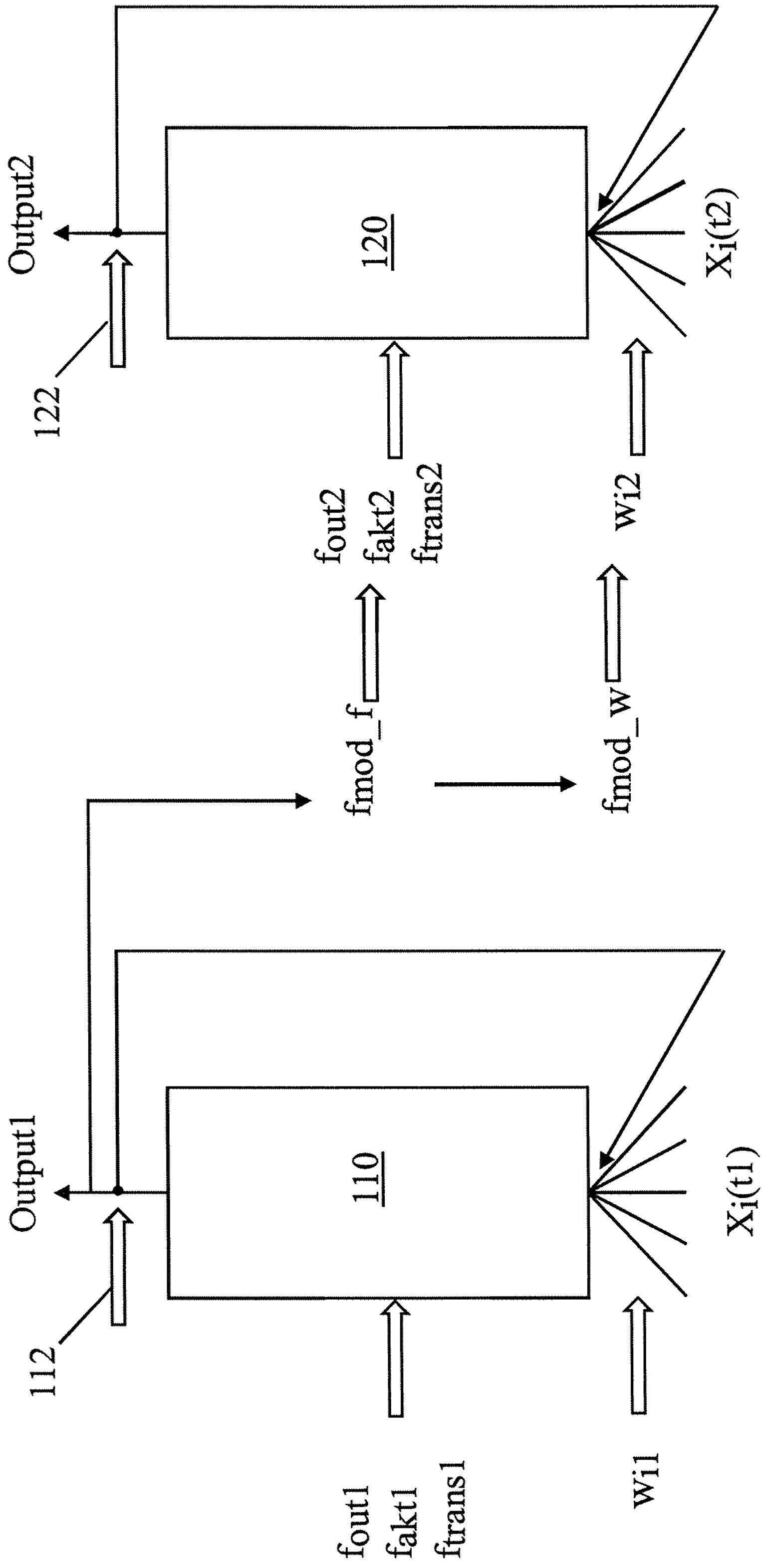
Figure 5:
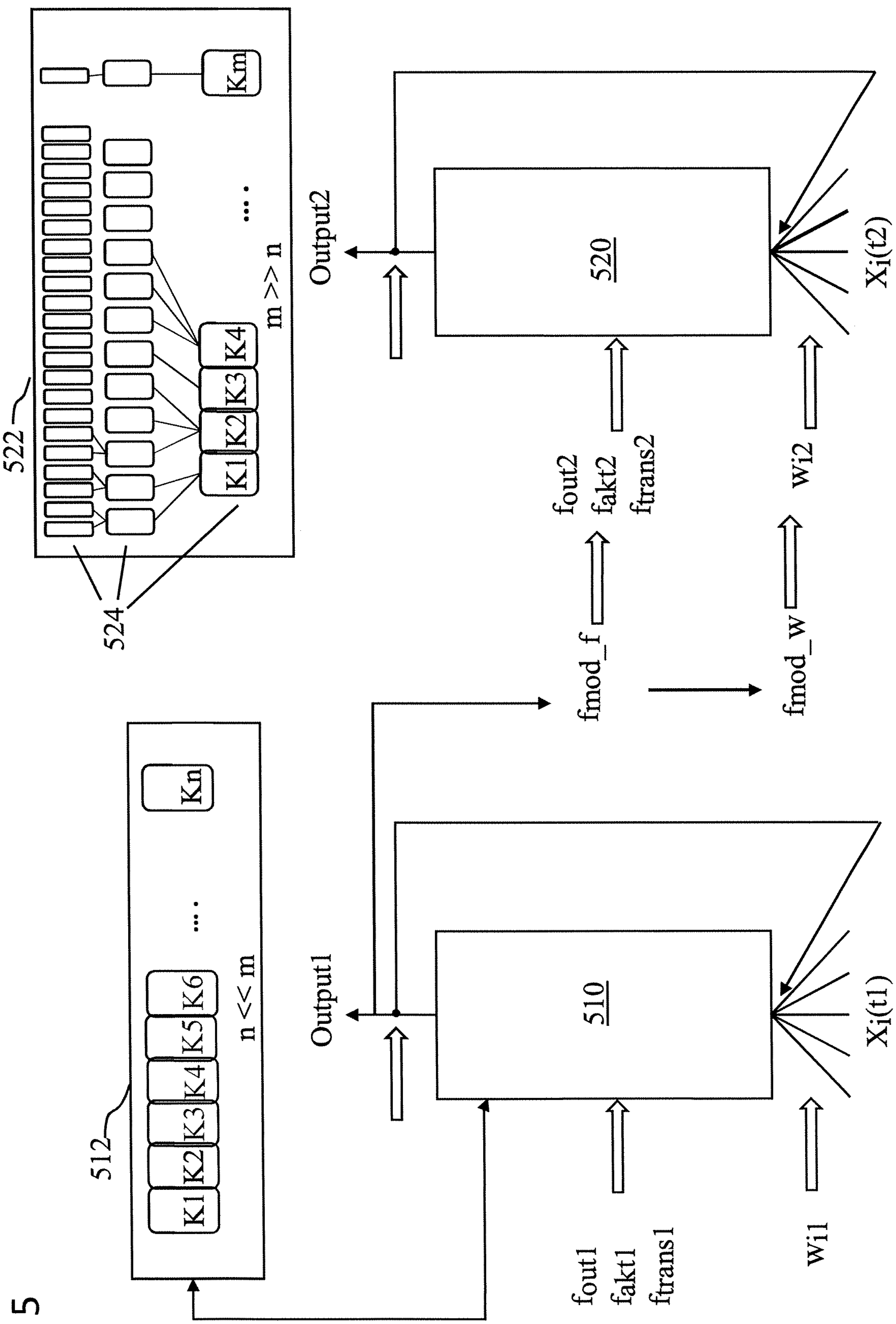
Figure 6:
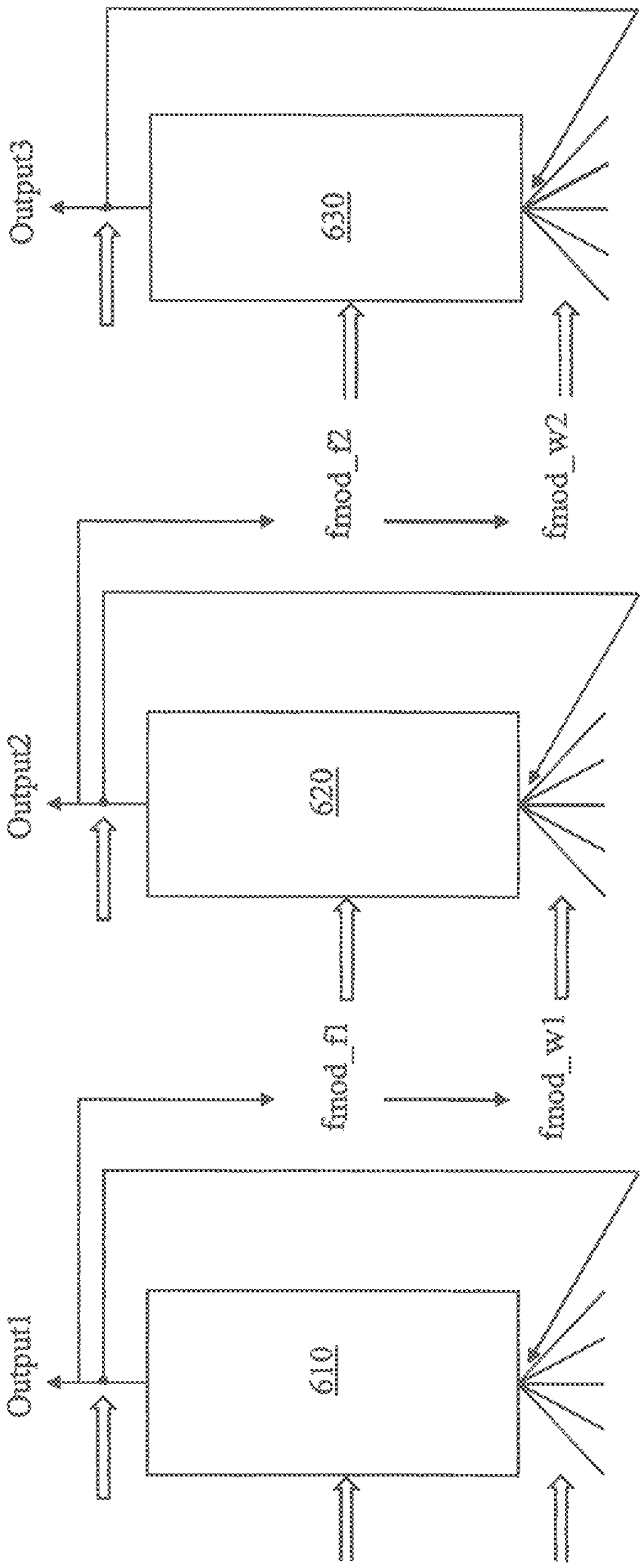
Figure 7:
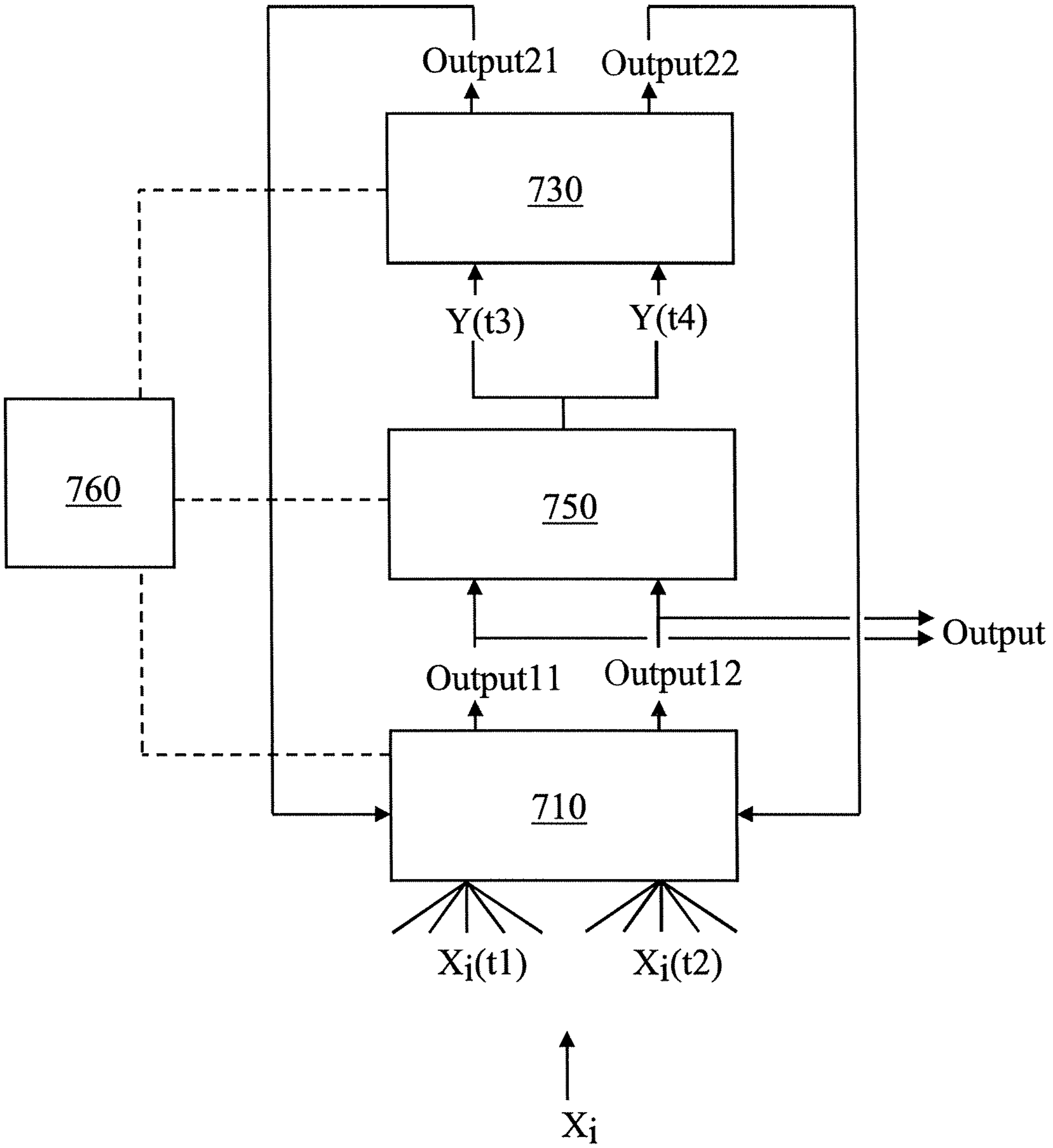
Figure 8:
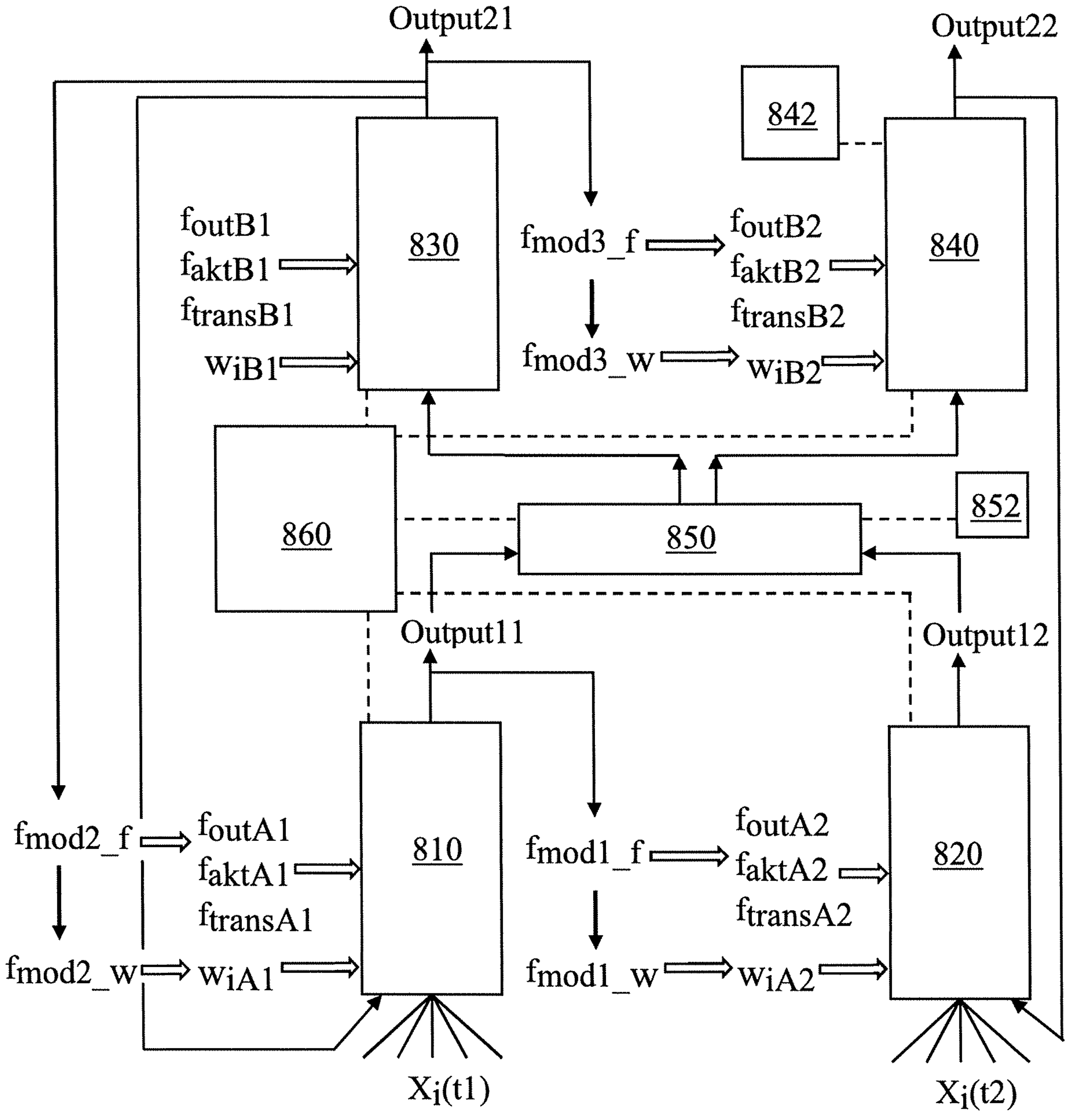

FIG. 5 schematically shows a system as in FIG. 1 with the associated classification memories;

FIG. 6 shows an alternative system with three coupled artificial learning units, FIG. 7 shows an exemplary overall system according to the invention with a working level, an evaluation level and a projection level; and FIG. 8 shows an exemplary overall system according to the invention with two artificially learning work units, two artificially learning evaluation units and a projection level.

DETAILED DESCRIPTION OF EMBODIMENTS

FIGS. 1 to 6 as well as their following description concern both the artificial learning work units and the artificial learning evaluation units. In the description of FIGS. 1 to 6, the term “artificial learning unit” or “artificially learning unit” is therefore used, which can stand for both “artificial learning working unit” and “artificial learning evaluation unit”. Artificial learning units that are coupled as described in connection with FIGS. 1 to 6 are referred to as an “artificial learning system”.

FIG. 1 shows an exemplary embodiment with two linked artificial learning units 110, 120, which is described in more detail below. Together, the artificial learning units 110, 120 form an artificial learning system. In the following explanations, the artificial learning units are exemplarily designed as neural networks, which are in particular fed back, e.g. by using the output values as indicated by arrows 112, 122 as input for the respective network.

In this case, a first artificial learning unit, here in the form of a first neural network 110, is provided, which can essentially serve to categorise or classify the input signals $X_i$ and to influence a second artificial learning unit 120, here a second neural network, with the result of this categorisation or classification. In doing so, the results of the first neural network are preferably not used as input values for the second neural network, but to influence existing weights, step sizes and functions of the network. In particular, these parameters of the second neural network may be influenced in such a way that they are not completely redefined, but the original parameters of the second network 120 are modulated or superimposed based on the output signals of the first neural network 110. This means that the two neural networks otherwise preferably operate independently, e.g. train their basic values themselves, but may be coupled by a superposition. In this regard, the two neural networks may be designed to be substantially similar to each other, but with, for example, significantly different levels of complexity, such as the number of layers and classifications present. Further, each of the neural networks may comprise its own memory.

In a possible embodiment, the first neural network 110 can be used as a categorising network, which serves to categorise the input values roughly and quickly, while then, on this basis of the categorisation result, the second network is influenced accordingly by modulating parameters of the second network. For this purpose, the first neural network can be a network with comparatively few levels, which has a memory with a few classes $K_1$, $K_2$, . . . $K_n$, which are preferably highly abstracted in order to achieve a rough categorisation. For example, this first neural network could be limited to 10, 50, 100 or 500 classes, whereby these numbers are of course only to be understood as rough examples. In particular, the training of the first neural network can be carried out individually and independently of further coupled neural networks. In addition or alternatively, however, a training phase in a coupled state with one or more coupled neural networks can also be used.

The first neural network should thus deliver a usable output within a short time, with which the second neural network can be meaningfully influenced. Weights and functions can be generated from the output values Output1 of the first neural network 110, which can be superimposed on the self-generated weights and functions of the second neural network 120. This means that the second neural network initially functions independently and does not completely adopt the output values of the first network or the parameters obtained therefrom. The second neural network 120 can also initially be trained independently in the usual way and thereby have self-generated weights.

The second neural network can be significantly more complex than the first neural network and in particular have more levels and/or memory classes. The degree by which the complexity of the second neural network is increased compared to the first network can be determined differently depending on the application. The input values or input data for the second neural network are preferably the same input values as for the first neural network, so that a more complex analysis can now be carried out with the same data. Alternatively, however, output values of the first neural network can also be used at least partially as input values of the second network. Especially in the case of a significantly different complexity of the second network, for example, a second network could be provided, to which both the original input values, which also served as input values for the first network, are fed as input values, and additionally the output values of the first network are used as input values of the second network.

Figure 2:
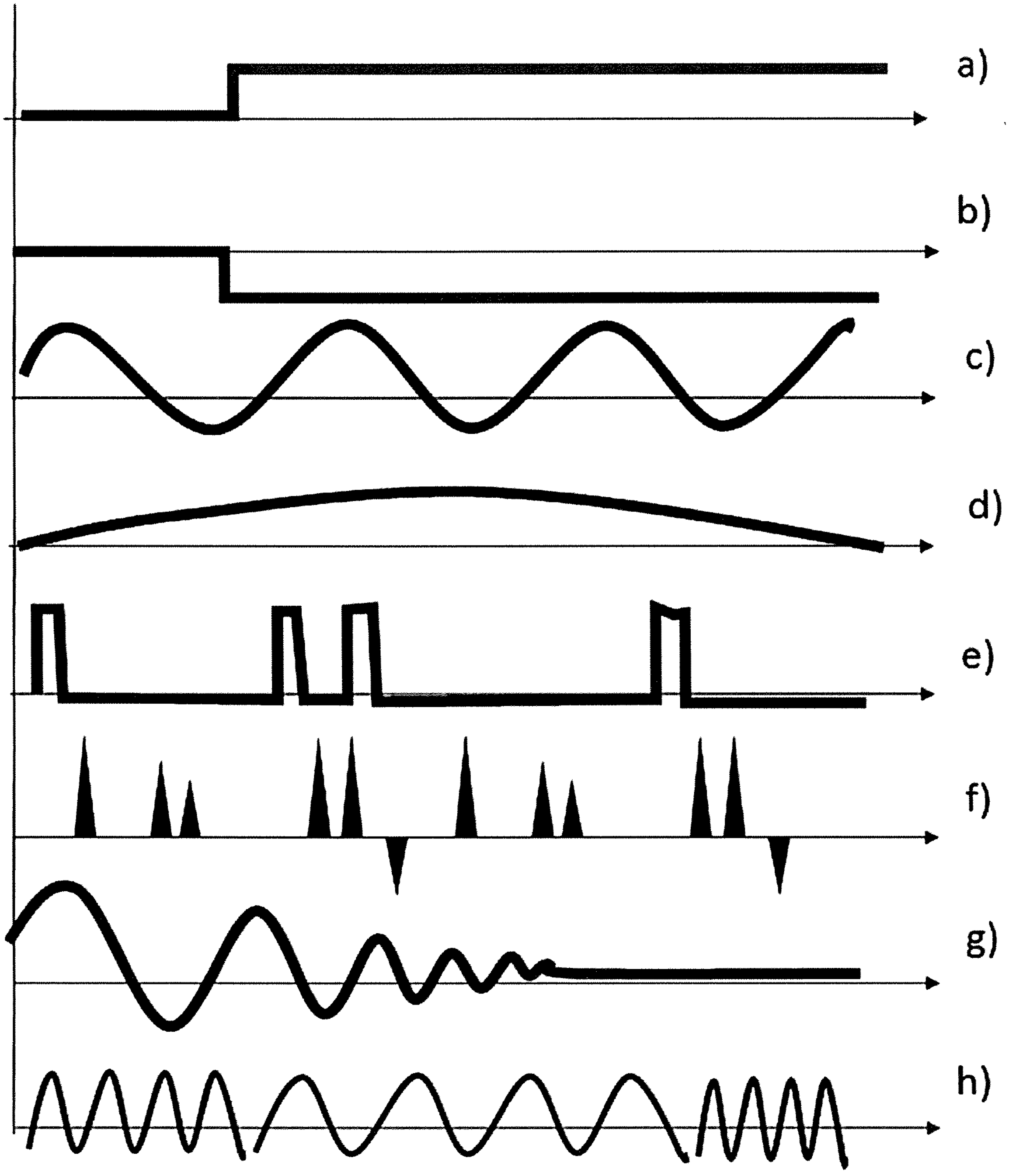

FIG. 2 shows examples of various modulation functions $f_{mod}$, with which one or more parameters of the second neural network can be superimposed. In principle, the superimposition or modulation can take place in any way. If a modulation function $f_{mod\_w}$ is applied to the weights $w_{i2}$ of the nodes, it can be provided, for example, that the weighting matrix of the second network 120 is used as an argument of the modulation function, or one-dimensional (also different) functions can be provided for each of the weighting values $w_{i2}$. If a modulation function $f_{mod\_f}$ is applied to one of the descriptive functions of the second neural network, i.e. to a transfer function $f_{trans2}$ an activation function $f_{akt2}$, a propagation function or an output function $f_{out2}$ of the network 120, this can be done by linking the two functions, and again a modulation function $f_{mod\_f}$ can be applied either to only some or to all of the relevant descriptive functions (e.g. to all activation functions $f_{akt2}$ of the second neural network 120). Similarly, parameters of the functions of the second neural network can be varied by modulation functions. Modulations may be applied equally to all nodes of a network, or alternatively only to a subset of nodes, or modulated differently for each node. Likewise, for example, modulation can be staggered separately or in a different way for each layer of a network.

In particular, the modulation functions $f_{mod}$ can also be time-dependent functions, so that the weights $w_{i2}$ or functions of the second neural network are changed in a time-dependent manner. However, static modulation functions for modulating the second neural network are also conceivable. In this case, the modulation is applied to the parameters of the second network 120 that are already originally defined for this second network (such as the propagation functions or the activation functions), or that were obtained independently in the training phase, such as the adapted self-generated weights.

As examples of this, eight different time-dependent modulation functions are shown in FIG. 2, where the modulation function is given by multiplying an original parameter by values as illustrated in FIG. 2. Example a) shows a simple binary step function in which the value zero is specified up to a specified time and then a value greater than zero is specified. Here, the second value can in principle be 1, but could also have a different value, so that the original parameters are additionally assigned a factor. In this way, for example, a weighting is switched on and off time-dependently or amplified time-dependently. Example b) shows a similar situation in which a step function with a second value less than zero is specified. Likewise, as an alternative to the variants from examples a) and b), step functions are conceivable that comprise two or more different values not equal to so that the level is raised or lowered accordingly as a function of time.

Example c) shows a periodic modulation function that can also be applied to any parameter of the second network and in this way will periodically amplify or attenuate certain elements depending on time. For example, different amplitudes and/or periods could also be selected for such a function for different nodes and/or different layers. Any periodic function can be used at this point, such as a sine function or even non-steady functions. Depending on the type of concatenation of the functions with the self-generated functions of the second network, only positive or also negative function values can be selected.

Example d) shows a slow continuous temporary increase and decrease of the level. Example e), on the other hand, describes brief, approximately rectangular high levels with an otherwise low function value, which can optionally also be zero. Similarly, example f) shows irregularly distributed and very short peaks or spikes, which thus cause a level increase or change for a very short period of time. Here, the peaks have different amplitudes and can take on both positive and negative values (relative to the basic value). For the variants from examples e) and f), both regular, periodic and temporally completely irregular (e.g. stochastically determined) distributions of the peaks or amplifications can be present. Short level increases, for example, can lie within the time of a decision cycle of the second neural network, while longer level changes can extend over several decision cycles.

Example g) in FIG. 2 further shows a damped oscillation, which could also be arbitrarily designed with different dampings and amplitudes. Finally, example h) shows a temporal sequence of different oscillations around the fundamental value, whereby in particular the period lengths of the oscillations differ, while the amplitude remains the same. This combination of different oscillations can also be designed as an additive superposition, i.e. beat.

In general, any modulation functions are conceivable and the functions shown in FIG. 2 are only to be understood as examples. In particular, any combination of the example functions shown is possible. It is also understood that the baseline shown in all examples can run at 0 or at another basic value depending on the desired effect of the modulation function. In the case of a pure concatenation of the modulation function with the respective modulated function, a basic value of 0 and corresponding increases in the function value can ensure that the respective node only contributes to the processing in a time-dependent manner and is switched off at other times. With a basic value of 1, on the other hand, it can be achieved that, for example, with the example from FIG. 2*a*), a modulation function that is applied to the weights first reproduces the self-generated weights of the modulated network as a basic value and then, from the stepped higher value, has correspondingly increased weights. Accordingly, such a function also acts on the modulation of the functions, such as the activation function.

As already described, a modulation function can be formed on the basis of the output values of a first artificial learning unit, i.e. in the present example on the basis of the first neural network. The relationship between the output values and the modulation function formed therefrom can be arbitrarily designed. For example, this relationship may be generated at least in part in a joint training phase of the coupled network. In other embodiments, the dependency between the modulation functions and the output values of the first network may be predefined, for example, a modulation function may be given as one of the functions shown in the figure, with the magnitude of the level excursions being determined by an output value. Optionally, it could also be decided that at certain output values no modulation of the second network takes place at first.

Figure 3:
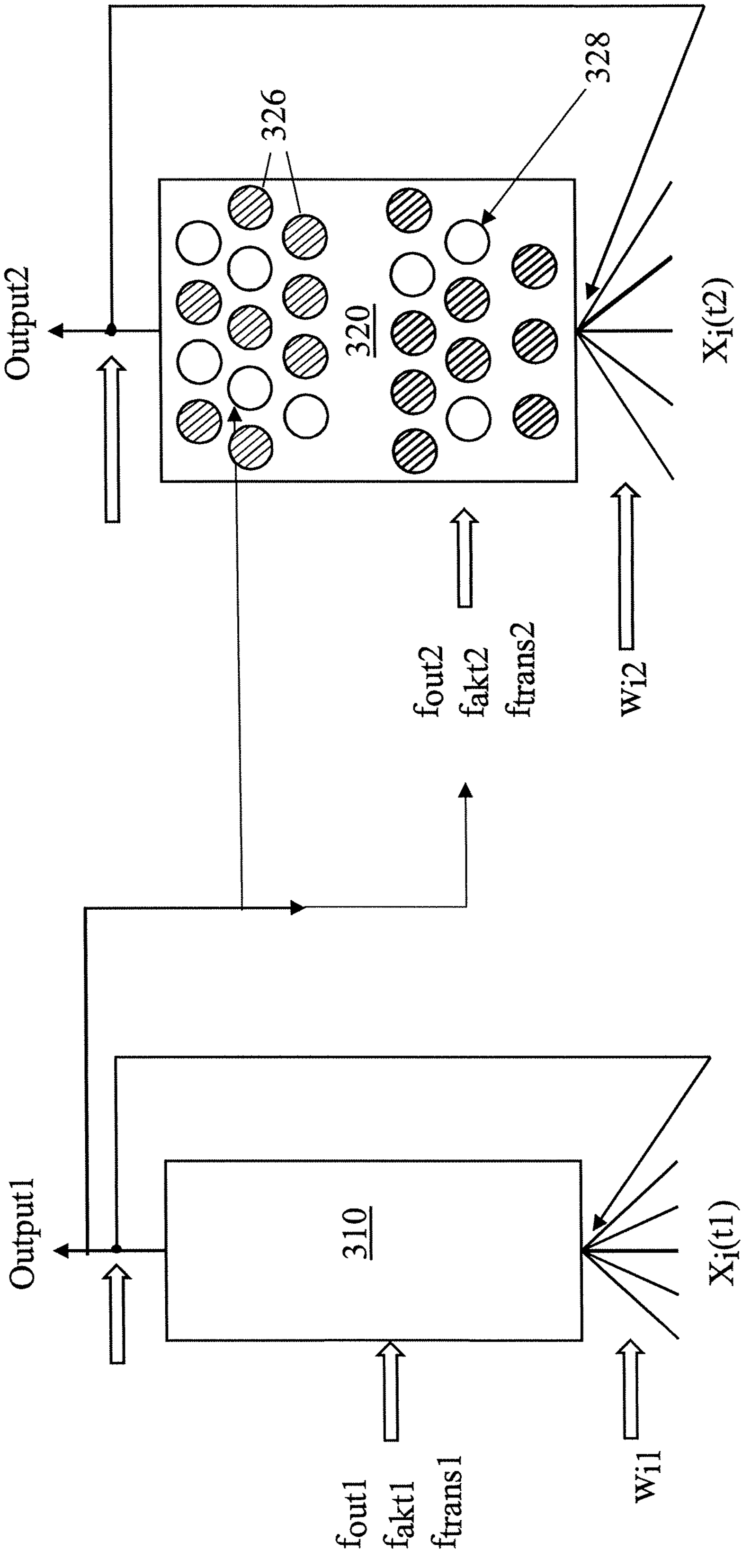
FIG. 3 illustrates the application of a dropout procedure in two coupled neural networks.

Alternatively or in addition to applying modulation functions to the weights and functions of a second neural network, a coupled dropout method can also be applied, which is shown in FIG. 3. This is conventionally a training procedure for a neural network in which only some of the neurons present in the hidden layers and the input layer are used in each training cycle and the rest are not used ("drop out"). To this end, the prior art usually sets a dropout rate based on the feedback errors of the network, which determines how large a proportion of the total network is made up of neurons that are switched off. Similarly, instead of neurons, some of the edges or connections between neurons could be switched off.

Such a partial disconnection of neurons and/or edges can now also be used in a second neural network in exemplary embodiments, whereby now the dropout parameters are not used on the basis of the error feedback of the network itself, but as in the case of time-dependent modulation in dependence on the output values of a first neural network. Thereby, for example, a dropout rate for the second neural network can be determined based on the output values Output1 of the first neural network 310, which is then applied to the second network. The figure again shows two coupled networks 310, 320 as in FIG. 1, whereby now the neurons or nodes 326, 328 of the second network 320 are schematically indicated as circles. The connecting edges are not shown, and the arrangement of the neurons shown is not intended to have any compelling relationship to their actual topology. Via the dropout rate, a part of the existing neurons is now deactivated and thus not used. The active neurons 326 of the second network are shown hatched in the figure, while the unfilled neurons are intended to represent the inactive dropout neurons 328.

In a general way, the coupled dropout described here can also be understood as a modulation function $f_{mod}$ by using either 0 or 1 as the modulation function for the weight or e.g. the output function of each individual node. In this case, it is possible to determine which of the neurons 326, 328 are switched off on the basis of the output values of the first network, or only the rate can be specified and it can be determined via stochastic functions which neuron is switched off. Again, the dropout rate may be determined based on the output values Output1 of the first network 310. Optionally, a dropout modulation function can also cause a time-dependent shutdown, which would correspond, for example, to a concatenation of a dropout function with a modulation function as shown in FIG. 2. Similarly, a sequence of pattern cutoffs that have been proven in previous training may also be used, such that, for example, cyclic pattern variations are used for cutoff in the second neural network 320.

In general, the dropout can ensure that the working speed of a neural network is increased. It also prevents neighbouring neurons from becoming too similar in their behaviour. The coupled dropout as described above can be used both in a joint training phase in which the two networks are coupled and in an already trained network.

To ensure that the coupled neural networks complement each other in a meaningful way, it can be determined which of the neural networks dominates the overall system at any given time. The network whose output values determine the output of the overall system can be described as the dominating network or dominance. In the following, it is assumed that only one network in a group of two or more coupled networks is dominant and that the output of the dominating network is equal to the output of the entire system. However, other embodiments are also conceivable in principle, so that, for example, rules are specified which describe a processing of the output values of the dominating nets to a final total output value in the case of more than one dominating net.

In exemplary embodiments, a timer or timing element can be implemented for this purpose, which sets a time limit for one or more of the coupled neural networks. This time specification should preferably be understood as a maximum value or temporal upper limit after which an output value of the respective network must be available, so that an output can also be available earlier. At the latest after the time specified for a particular network has elapsed, an output value of this network is then evaluated. The timer can thus control and/or change the dominance between the coupled nets on the basis of fixed time specifications.

Figure 4:
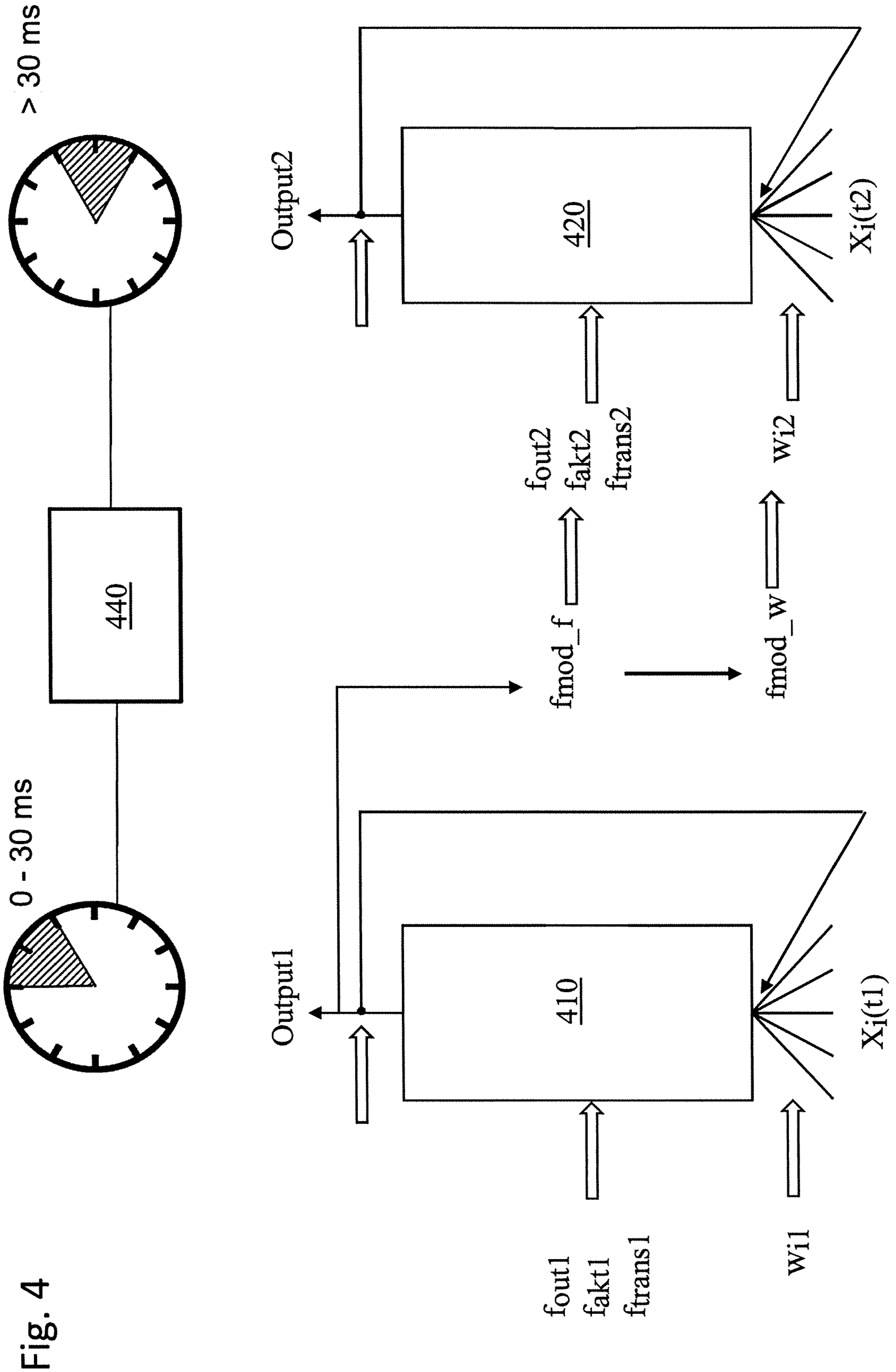
FIG. 4 shows a system as in FIG. 1 with an additional timer.

An exemplary embodiment of this type is shown in FIG. 4. The design and coupling of the two neural networks 410, 420 can correspond to the example already described in FIG. 1. The timer 440 now ensures that the output of the first neural network 410 is evaluated at the latest after a predetermined time which is defined by a predetermined time parameter value. The required time can be measured, for example, from the time the input values $X_i$ are fed into the respective network. The selection of the predefined time parameters for a network can be carried out in particular depending on the complexity of a network, so that usable results can actually be expected in the predefined time. In an example such as that previously described, in which the first neural network 410 is preferably formed by a network with only a few hidden layers and a small number of classifications, a correspondingly short time can thus also be selected for this first network. Likewise, further considerations can be taken into account when selecting the time parameters for a network, such as the existing hardware, which decisively influences the computing time of the networks, and/or also the area of application considered by the coupled networks. Further, the predetermined time parameters may be variable and, for example, may be modified or redefined depending on results from at least one of the coupled neural networks. It is understood that such a time specification should at least comprise the time span which is required as a minimum time for the single traversal of the respective network 410, 420. In FIG. 4, a time span of 30 ms is specified as an example for the first network, so that during a process run, this network dominates in the time from Oms to 30 ms from the start of the process. However, a suitable other value for this time span can of course also be selected.

During the time period specified by the time parameter for the first network 410 (here 30 ms), the first neural network will process the input values $X_i$ in the usual way. After the predetermined time has elapsed, functions can be generated from the output Output1 of the first neural network 410, which are used to superimpose or modulate the second neural network's own weights and functions. Furthermore, the output values of the first neural network may also be processed independently as an alternative or in addition to being used for influencing the second network 420 and used, for example, as a fast output of the overall system.

Once the modulation functions $f_{mod\_f}$, $f_{mod\_w}$ have been applied to the second neural network 420, the timer 440 may start a new timing measurement, now applying a second timing parameter predetermined for the second neural network 420.

In this case, the second neural network 420 can optionally also already independently process the input values $X_i$ before the modulation by the obtained modulation functions $f_{mod\_f}$, $f_{\_modw}$, so that, for example, the input values can also be passed to the second neural network 420 before the start of the second predetermined time period and can be processed there accordingly. After the first time period has elapsed, the parameter values and functions of the second neural network are then superimposed by applying the corresponding modulation functions $f_{mod\_f}$, $f_{\_modw}$. One or more modulation functions may be formed for different parts of the second neural network 420, for example for the weights, output functions, propagation functions and/or activation functions of the second neural network. In the case of a second neural network 420 which is designed to be significantly more complex than the first neural network 410, for example by having significantly more layers and nodes and/or by having a higher number of memory classes, the second neural network will require a comparatively higher computational effort and thus also more time, so that in this case the second time period can be selected to be correspondingly longer.

Optionally, each of the networks 410, 420 can continue to continuously process and evaluate the input values, even while another network is determined to be the dominant network in the overall system due to the current time spans. In particular, in the example shown of two coupled nets, the first net can continuously evaluate the input values even while the dominance is with the second net and the output values of the overall system therefore correspond to the output values of the second net after the second time period has elapsed and a solution has been found by the second net. In this way, a fast categorising network such as the first network 410 described here, which evaluates the available input values throughout, can also perform short-term interventions, insofar as the output values found find their way into the overall output. Such embodiments are described in more detail below.

As a result of such time control by means of predefined time periods in a timer, the overall system can make decisions early on and, for example, already be capable of acting without the final evaluation and detailed analysis by the second neural network already having to be completed. As an example, consider a situation in an autonomous driving system that is to be evaluated by such a system with at least two coupled networks. Through the first unit or the first neural network, an early categorisation "danger" can be achieved, which does not yet include a further evaluation of the type of danger, but can already lead to an immediate reaction such as a slowing down of the speed of the vehicle and the activation of the braking and sensor systems. At the same time, based on the categorisation, namely under the influence of the modulation by the output values of the first network, the second neural network carries out a more in-depth analysis of the situation, which can then lead to further reactions or changes of the overall system based on the output values of the second network.

It is also conceivable not to specify a time limit for each of the coupled networks, but only for one of the networks (or, if more than two networks are coupled, also for only a subset of the coupled networks). For example, in the above example, a timer could be used for the first, fast-categorising neural network, while the second network is not given a fixed time limit, or vice versa. Such an embodiment can also be combined with further methods for determining the currently dominant network, which are described in more detail below.

In all embodiments with an inserted timer, it can be provided that the output values of the neural network that currently has an active timer are used as the output of the overall system. Due to the time that a network needs to reach a first solution for given input values, there is a certain latency time within which the previous output values (of the first or second network) are still available as total output values.

If timers or timings are only defined for some of the coupled nets, e.g. a timer is only active for a first net, it can be defined, for example, that the output of the overall system generally always corresponds to the output of the second net and is only replaced by the output of the first net if a timer is active for the first net, i.e. a predefined period of time is actively running and has not yet expired.

In a system with more than two nets, a sensible synchronisation of the nets among each other can also be made possible by aligning the predefined time spans and changing the timer, especially if several nets with different tasks are to arrive at a result simultaneously, which in turn is to have an influence on one or more other nets. Similarly, by adapting the specified time periods and processes, synchronisation can also be achieved among several separate overall systems, each comprising several coupled networks. For example, the systems can be synchronised by a time alignment and then run independently but synchronously according to the respective timer specifications.

In addition or alternatively to changing the respective dominating neural network in the overall system on the basis of a timer, each of the neural networks itself can also make decisions on the transfer of dominance in a cooperative manner. This can mean, for example, that a first neural network of an overall system processes the input values and arrives at a certain first solution or certain output values, e.g. achieves a classification of the input values into a certain class according to a classification trained during a training phase and, upon achieving this classification, transfers dominance to a second neural network of the overall system.

As with the centre of gravity change with the help of the timer, it can be specified here that the output values of the overall network correspond in each case to the output values of the currently dominating network.

For this purpose, for example, changes in the input values can be evaluated. As long as the input values remain essentially unchanged, the dominance distribution among the coupled networks can also remain essentially unchanged, and/or be determined solely on the basis of a timer. However, if the input values suddenly change, a predetermined dominance may be set that overrides the other dominance behaviour of the coupled nets. For example, for suddenly changed input values, it can be determined that the dominance in any case first passes back to the first neural network. This also restarts an optionally available timer for this first neural network and the process is carried out as previously described. A significant change in the input values could occur, for example, if sensor values detect a new environment or if a previously evaluated process has been completed and a new process is now to be triggered.

Threshold values can be specified in the form of a significance threshold, which can be used to determine whether a change in the input values should be considered significant and lead to a change in dominance. Individual significance thresholds can also be specified for different input values or for each input value, or a general value, e.g. in the form of a percentage deviation, can be provided as the basis for evaluating a change in the input values. Likewise, instead of fixed significance thresholds, there could be thresholds that can be changed in time or adaptively and depending on the situation, or they can be functions, matrices or patterns, on the basis of which the significance of the change can be evaluated.

Alternatively or additionally, the change in dominance among the coupled networks may be made dependent on the output values found for each network. Depending on the embodiment, for example, the first neural network can evaluate the input values and/or their change. In this case, significance thresholds can be predefined in each case for the classes which are available for the first neural network for classification, so that in the case of a result of the first neural network which results in a significant change in the class found for the input data, a transfer of dominance to the first neural network takes place immediately, so that a rapid re-evaluation of the situation and, if necessary, a reaction can take place. In this way, it can also be prevented that despite a significantly changed input situation, which was recognised by the first, quickly categorising network, the second neural network continues to analyse in depth for an unnecessarily long time without taking the change into account.

In all of the above examples, the output values of the overall system can be further used in any way, for example as direct or indirect control signals for actuators, as data that is stored for future use, or as a signal that is passed on to output units. In all cases, the output values can also first be further processed by additional functions and evaluations and/or combined with further data and values.

FIG. 5 again shows the simple implementation example as in FIG. 1 with two unidirectionally coupled networks 510, 520, whereby a classification memory 512, 522 is now shown schematically for each of the networks. The type of classifications Ki used is initially of secondary importance here and will be described in more detail below. In particular, the dimension and structure of the two classification memories of the first 512 and second network 522 can differ significantly, so that two neural networks with different speeds and foci are formed. Thus, for example, as already briefly described, an interplay of a fast, roughly categorising network and a slower, but more detailed analysing network can be achieved to form a coupled overall system.

In the present example, a first neural network 510 is formed with relatively few classifications K1, K2, . . . , Kn, which can, for example, also only follow a flat hierarchy, so that categorisation only takes place in one dimension. Preferably, such a first network 510 can also be comparatively simple in its topology, i.e. with a not too large number n of neurons and hidden layers. In principle, however, the network topology can also be essentially independent of the classifications.

The second neural network 520 can then have a significantly larger and/or more complex classification system. For example, this memory 522 or the underlying classification can also be structured hierarchically in several levels 524, as shown in FIG. 5. The total number m of classes K1, K2, . . . , Km of the second network 520 can be very large, in particular significantly larger than the number n of classes used by the first neural network 510. For example, the number m, n of classes could differ by one or more orders of magnitude. This achieves an asymmetric distribution of the individual networks in the overall system.

The fast classification by the first neural network 510 can then be used to quickly classify the input values. Abstract, summary classes can preferably be used for this purpose. The classification of a detected situation (e.g. based on sensor data such as image and audio data) can then, in an example, initially be carried out by the first neural network 510 as a "large, possibly dangerous animal" without carrying out any further evaluations for this. This means that, for example, no further classification according to animal species (wolf, dog) or as a dangerous predator is carried out in the first network, but instead classification is only carried out according to the broadest possible general characteristics such as size, detection of teeth, attack postures and other characteristics. This data, which essentially corresponds to the output "danger", can then optionally already be passed on to appropriate external systems for preliminary and rapid reaction, e.g. a warning system for a user or to specific actuators of an automated system. In addition, the output Output1 of the first neural network 510 is used to generate modulation functions for the second neural network 520 as described.

The same input values $X_i$, e.g. the sensor values mentioned, are also given to the second neural network 520. In this case, the input values can be input immediately, i.e. essentially simultaneously as to the first network, or with a delay, whereby, depending on the embodiment, they are already input before or only when the modulation functions are applied, i.e. when the result of the first network is available. Preferably, they should not be given or passed on to the second neural network later, especially in the case of time-critical processes, in order to avoid delays. The second neural network then also calculates a solution, whereby the original self-generated weights from this second network and its basis functions (such as the specified activation functions and output functions) can each be superimposed on the basis of the modulation functions formed from the output values of the first network. This allows the iterative work of the second net to omit a large number of possible variants for which there would be no time in the case of a critical situation (e.g. a hazardous situation) quickly detected by the first net. While the slower analysis of the second neural network takes place, possible reactions can already be carried out on the basis of the first neural network, as described. This corresponds to an initial instinctive reaction in biological systems. The hierarchical and, compared to the first network, significantly larger memory of the second network then allows a precise analysis of the input values, in the example mentioned a detailed classification into the class "dog", the respective breed, behavioural characteristics that indicate danger or a harmless situation, and others. If necessary, after the second neural network has reached a result, the previous reaction of the entire system can be overwritten, e.g. by downgrading the first classification "danger" again.

Overall, for such a coupled overall system with asymmetric classification, it can be envisaged, for example, that the classes Kn of the quickly classifying first network 510 primarily perform abstract classifications such as new/known situation, dangerous/undangerous event, interesting/uninteresting feature, decision required/not required and similar, without going into depth. This first classification does not necessarily have to correspond to the final result that is ultimately found by the second unit 520. However, the two-stage classification by at least one fast and one deep analysing unit thus allows for feeling-like or instinctive reactions of an artificially learning overall system. For example, if an object is identified by image recognition that could possibly be a snake, the "worst case" can preferably be the result of the first classification, regardless of whether this classification is probably correct or not. What is present in the case of human intelligence as evolutionary knowledge and instinctive reaction can be replaced by a fast first classification with pre-programmed knowledge, so that corresponding standard reactions (keep distance, initiate movement, activate increased attention) can also be carried out by the overall system and its actuators. The additional modulation of the second learning unit on the basis of this first classification can then be understood similarly to an emotion-related superimposition, i.e., for example, corresponding to a fear reaction that automatically initiates a different conscious situation analysis than a situation understood as harmless. The superimposition of the parameters of the second neural network, which is carried out by the modulation functions, can thereby cause the necessary shift into other classification spaces that are otherwise not reached by default or not immediately.

Accordingly, such systems can be used for a variety of application areas, for example in all applications in which critical decision-making situations occur. Examples are driving systems, rescue or warning systems for different types of hazards, surgical systems, and generally complex and non-linear tasks.

In the embodiments described so far, only two artificial learning units have been coupled together. However, this idea is in principle also applicable to more than two units, so that, for example, three or more artificial learning units can be coupled in a corresponding manner, whereby it can be determined which of the units can modulate the parameters of a specific other unit or several other units.

FIG. 6 shows an example in which three neural networks 610, 620, 630 (and/or other artificial learning units) can be provided, whereby the output values of the first network 610 yield modulation functions for the weights and/or functions of the second network 620, and whereby in turn output values of the second network yield modulation functions for the weights and/or functions of the third network 630. In this way, chains of artificially learning units of any length could be formed, which influence each other in a coupled manner by superposition.

Similar to the earlier example with two neural networks, in one embodiment all coupled networks can receive the same input values and the processing can only be coupled by the modulation of the respective networks. However, embodiments are also conceivable in which, for example, a third neural network is provided following two neural networks as in FIG. 1, which receives the output values of the first and/or second network as input values. Optionally, the functions and/or weights of this third neural network could also be modulated by modulation functions, which are formed, for example, from the output values of the first network. These could be the same or different modulation functions than the modulation functions formed for the second network. Alternatively, for example, the output values of the third network could be used to form additional modulation functions which are then recursively applied to the first and/or second network.

It is understood that various further combinations of correspondingly coupled learning units are possible, in which at least two of the connected units have a coupling by forming modulation functions for the descriptive parameters of the units, in particular for the case of neural networks for the weights and/or functions of a network. As the number of coupled units increases, more complex variations of the modulations and couplings are also conceivable.

As already noted initially, the embodiments described here were described as examples with regard to neural networks, but can in principle also be transferred to other forms of machine learning. All variants are considered in which it is possible to influence at least a second artificial learning unit by a first artificial learning unit by superimposition or modulation on the basis of output values. The modification of the weights and functions of a neural network by superposition by means of modulation functions from the preceding examples may be replaced by a corresponding modulation of any suitable parameter controlling or describing the operation of such a learning unit. In each of the examples, the term "learning unit" may be replaced by the special case of a neural network, and conversely, the described neural networks of the exemplary embodiments may also each be implemented in a generalised form in the form of an artificial learning unit, even if it is not explicitly stated in the respective example.

In addition to neural networks, known examples include evolutionary algorithms, support vector machines (SVM), decision trees and special forms such as random forests or genetic algorithms.

Likewise, neural networks and other artificial learning units can be combined with one another. In particular, it is possible to replace, for example, the first neural network from the previous examples, which was shown as a fast categorising unit, with any other artificial learning unit. It is also possible to selectively choose a method that is particularly well suited for a fast, rough classification of features. The output values of such a first learning unit can then also be used, as described for two neural networks, to form modulation functions for a second artificial learning unit, which in particular can again be a neural network.

As mentioned above, systems comprising several coupled artificial learning units form "artificial learning systems".

In addition or alternatively to the described variants, an artificial learning system consisting of or comprising two or more coupled artificial learning units can be further improved by adding an instance that performs an evaluation or validation of results of the artificial learning system and influences the obtaining of results by the artificial learning system according to this evaluation. According to the invention, a further artificial learning system is used for this purpose. The structure and function of an overall system comprising two artificial learning systems are explained below.

Such artificial learning units that evaluate/validate the results of other artificial learning units or their results are called evaluation units. In contrast, artificial learning units that process or analyse the input values and arrive at corresponding results, which is checked by the evaluation units, are called working units. The function, i.e. the mapping of input values to output values, of the artificial learning units, which are in particular neural networks, is determined by parameters, e.g. functions and/or weights as described above.

Basic Structure and Function of the Overall System

FIG. 7 shows the basic structure of an overall system (or processing and evaluation system) comprising a working level 710 and an evaluation level 730, both of which are artificial learning systems, i.e. they comprise coupled artificial learning units and are constructed or function as described above. Further, the overall system comprises a projection level 750 and an overall sequence memory 760.

The overall system processes input data or input values $X_i$, which are e.g. a time series of sensor data or data obtained therefrom by pre-processing, whereby output data or output values (output) are obtained, which form the overall output of the overall system.

The working level 710 is set up to process or analyse the input values $X_i$, which are input into it in the form of first and second input values $X_i$ (t1) and $X_i$ (t2), e.g. continuous sensor data at times t1, t2. On the one hand, first output values (output11) are determined from the first input values $X_i$ (t1) according to a first classification, i.e. the working level, which is an artificial learning system, is trained to perform a corresponding classification of the first input values. On the other hand, second output values (output12) are determined from the second input values $X_i$ (t2) according to a second classification, i.e. the working level is thus trained accordingly.

The determination of the first output values is preferably done in a short period of time relative to the time needed to determine the second output values. Accordingly, the first classification comprises few classes relative to the second classification. Thus, the first output values are based on a coarse analysis of the input values while the second output values are based on a fine analysis of the input values.

In the projection level 750, first situation data Y(t3) and second situation data Y(t4) are formed based on the first and/or second output values. Thereby, the first situation data is based at least partially on the first output values and the second situation data is based at least partially on the second output values. For example, in the simplest case, the situation data may be the respective output values themselves. Going further, the situation data can also be formed at least partially on the basis of other values. Preferably, however, the first situation data is formed based on the first output values and the second situation data is formed based on the second output values. In addition, an optional memory element can be assigned to the projection level as a projection memory (not shown in FIG. 7; cf. FIG. 8), in which data occurring in the projection level can be stored.

The projection level 750 can be designed as a software and/or hardware unit or as a combination of several such units. In particular, the projection level can form a composite of several units, which can also include artificial learning units and their memory elements. The projection level 750 can thereby form a central unit in which the outputs of at least the working level are processed and linked, e.g. a multiplexer unit, a unit which generates sequences from data, a unit which, after a positive or negative evaluation, imprints an identifier or label on the stored data or sequences, which can, for example, abbreviate decisions when comparing new data with stored data. These functions can also be performed in whole or in part by programme modules. The projection layer may also include input and/or output units, such as a screen or an acoustic unit, which makes it possible to communicate with a user or a user supporting, for example, a training phase of the system, and to assess, for example, the current processing status.

The first/second situation data formed in the projection level 750 form the input of the evaluation level 730. The working level 730 is arranged to determine as output first evaluations (output21) and second evaluations (output22) indicating whether or to what degree the first situation data satisfy predetermined first conditions, or whether or to what degree the second situation data satisfy predetermined second conditions. The evaluation level as an artificial learning system is thus trained to determine output values, called first/second evaluations, that indicate whether or to what degree the first/second situation data satisfy predetermined first/second conditions. The evaluations can independently be simple yes/no evaluations (e.g., an evaluation can take only the values 0 or 1) or gradual evaluations indicating the degree to which a condition is met (e.g., an evaluation can take all values from 0 to 1). Accordingly, the phrase "whether conditions are fulfilled" or similar in the context of this application, although not always explicitly mentioned, is also intended to include the case that the conditions are fulfilled to some degree, thus is to be understood in the sense of "whether or to what degree conditions are fulfilled" or similar. The system can now be set up to reject or otherwise modify output values of the working units on the basis of the evaluations, in particular to influence the processing of the input values by the working level.

The determination of the first evaluations is preferably carried out in a short period of time relative to the period of time required for the determination of the second evaluations. Accordingly, relatively few first conditions (in particular less than 1000, preferably less than 100) and relatively many second conditions are given. The first evaluations thus indicate whether or to what extent rough conditions are fulfilled, while the second evaluations indicate whether or to what extent fine second conditions are fulfilled relative to the first conditions.

The first and second evaluations (output21, output22) now influence the processing of the first and second input values $X_i$ (t1), $X_i$ (t2). In particular, the first evaluations influence the determination of the first output values from the first input values and the second evaluations influence the determination of the second output values from the second input values.

The total or overall output is in any case based on the first and/or second output values of the working level 710. Whether the first or the second output values are regarded as the total output at a particular time is preferably determined by the working level, but can also be controlled by a timer, which can be regarded as a component of the working level. It is also conceivable here to use a combination of the first and second output values as the total output. Thus, the influence of the working level 710 by the evaluation level 730 has only an indirect influence on the total output; in this sense, the first and second conditions do not represent absolute restrictions.

Thus, when processing input values, first/second output values (output11, output12) are determined by the working level 710 from the first/second input values $X_i$ (t1), $X_i$(t2), first/second situation data Y(t3),Y(t4) by the projection level 750 from the first/second output values, and from the first/second situation data first/second evaluations (Output21, Output22), which in turn influence the work level. The total or overall output is determined from the first/second output values.

This process repeats itself in several iterations or repetitions, wherein the working level, influenced by the evaluations of the evaluation level, tries to determine an overall output or first and/or second output values that are in accordance with the first/second conditions. In general, input values $X_i$ may occur for which it is not possible to find such an overall output (or first and/or second output values) that satisfies all conditions. In this case, the process of repetitions can be aborted if it is determined that the total output (or first and/or second output values) no longer changes significantly from repetition to repetition or over a certain period of time, i.e. only within specified tolerances. The last total output of the system is then used as the final total output. The final total output then forms, so to speak, the best possible total output that can be found by the working level under the influence or advice of the evaluation level. A termination can also be time-controlled by a timer (for example in a real-time system), in which case the last total output is also used.

Each repetition/iteration produces corresponding data, which may include the first and second input values, the first and second output values, the first and second situation data, the first and second evaluations and the total output. In particular, it is envisaged that some or preferably all of these elements will form a data set referred to as the total or overall set.

All in all, a sequence of total or overall records or a total or overall sequence is produced according to the sequence of iterations. The total sets or the sequence of total sets can be stored in the total sequence memory 760. This is indicated by dashed lines connecting the total sequence memory to the three levels. During storage, the total records are preferably time-stamped and/or numbered and/or arranged according to their order or sequence. Preferably, it is intended to start storing a new sequence of total records each time the input values change substantially, i.e. more than a predetermined tolerance. The stored sequences of complete sets can be used in particular to trace the processing of input values by the overall system.

Explanations of the Conditions and their Effect on the Overall System

The (first/second) conditions can be simple conditions that, for example, check whether the situation data lie within a certain range of values. However, the (first/second) conditions can also be more complicated, for example in the form of normative rules R1 to Rn.

The (first/second) conditions can be technical conditions. For example, it could be checked in a machine whether the speed of a motor (which is analysed e.g. by the working level on the basis of vibration sensor data and output) is within a permissible speed range. A further rule would be to make such a speed check dependent on an operational state (which is also recorded by the working level using sensor data).

Further, the rules can also be of a non-technical nature, such as "No person may be killed" (R1) or "No person may be restricted in their freedom" (R2) or "No lies may be told" (R3). The rule fulfilment or a rule breaking can be engineered via one of the usual parameterisations, e.g. 0=no rule breaking, 1=rule breaking or graduated finer. These rules can be implemented as first conditions, the parameterisation of rule fulfilment or rule breaking then corresponds to the first evaluations. The second conditions can then represent a finer subdivision of the rules R1 to Rn into rule classifications K1 to Kn. These are exceptions, additions, or changes to the rules. These are exceptions, additions and alternatives to these rules. These rule classifications are initially structured in such a way that exceptions to R1 are given in the rule classification K1, to R2 in K2 and so on. In some situations, which are named in the rule classifications, the corresponding rule Rx may be broken. An exemplary rule classification K1*y* of rule R3 could be: "If people come to serious harm when the truth is told, lying is allowed". The rules still apply in principle, but only prima facie, as long as no rule-classification has to be applied. The second conditions (rule classifications K1 to Kn) thus represent a finer elaboration of the first conditions (rules R1 to Rn).

Memories can be provided in which the first and second conditions are stored. The structuring of the memories or of the rules R1 to Rn and rule classifications can correspond in particular to that shown in FIG. 5, whereby the relatively coarse rules R1 to Rn are stored in the memory 512 there and the relatively fine rule classifications K1 to Kn and their finer subdivision into levels 524 are stored in the memory 522, whereby m is preferably equal to n.

Preferably, the rules and/or rule classifications, i.e. the first and in particular the second conditions, are to be stored in a blockchain, wherein the rules are implemented in the form of so-called smart contracts. A smart contract can be regarded as a computer protocol that maps a rule or rule classification and checks its compliance.

If a rule classification is used, this condition is documented and stored in another memory (in particular overall sequence memory 760) according to the situation, whereby this is preferably done in a blockchain to ensure that this documentation cannot be modified. Thus, overall sequences or overall evaluation sequences are stored. The principle validity of rule R3 is not called into question by the rule classification. In the working mode of the working level or the overall system, it will lead to an iterative chain of adjustments and evaluations between the working level and the evaluation level in the case of a sequence of actions, so that a situation-related coordination-solution sequence is stored in the blockchain, in which the evaluation level points out conflicts with rules to the working level and makes suggestions for their modification, but does not decide the future action. The action decision, i.e. the overall output of the system, is made exclusively via the working level, as it is directly concerned with the external situation and the solution strategy, while the evaluation level is preferably only indirectly supplied with information already condensed via the projection level.

An exemplary extension of this basic principle is that the evaluation level also includes the overall sequences (preferably blockchain decision paths) in its search in conflict situations with a risk of violation of the rules R1 . . . n and checks for previously undertaken solutions. In terms of the self-learning system, it is therefore imperative that the success or failure of the action taken is also noted for each documentation in overall sequences (preferably blockchain documentation) in order not to commit errors again.

In a further extension of the principle, in the case of conflict with rule R1, for example, it is possible to search not only in the rule classifications K1 and their sub-classifications for linkage or coupling, modification, etc., but in all preferred classifications to see whether there is a previously unknown combination to solve the situation, even if the other rule classifications do not actually belong to rule R1.

In a further extension of the principle, changes can be made to the rule classification memory in the event of success or failure by inserting new, successful rule classifications and, if necessary, deleting existing rule classifications that are no longer current or have proven to be unfavourable. This results in a self-learning evaluation system (overall system) with a rigid set of rules, and at the same time a flexible classification system. These variants enable the implementation of "hard AI systems" in particular.

Exemplary Concrete Design of the Overall System

FIG. 8 shows an exemplary embodiment of an overall system in which the working level is formed by a first artificial learning working unit 810 and a second artificial learning working unit 820 coupled thereto and the evaluation level is formed by a first artificial learning evaluation unit 830 and a second artificial learning evaluation unit 840 coupled thereto. The artificial learning work and evaluation units can each be neural networks whose function is determined by parameters, in particular by functions (such as transfer functions $f_{trans}$, activation functions $f_{akt}$, propagation functions and output functions $f_{out}$) and weights/weightings.

The first working unit 810 is set up to determine the first output values (output11) from the first input values $X_i$ (t1), i.e. the working unit is trained accordingly as an artificial learning unit. The function of the first working unit is determined by parameters, in particular functions $f_{outA1}$ (propagation and output functions), $f_{aktA1}$ (activation functions), $f_{transA1}$ (transfer functions) and weights $w_{iA1}$, respectively. The second working unit 820 is set up to determine the second output values (output12) from the second input values $X_i$ (t2), i.e. it is trained accordingly. The function of the second working unit is determined by parameters, in particular functions $f_{outA2}$, $f_{aktA2}$, $f_{transA2}$ or weights $w_{iA2}$. The first evaluation unit 830 is set up to determine the first evaluations (output21) from the first situation data Y(t3). The function of the first evaluation unit is determined by parameters, in particular functions $f_{outB1}$, $f_{aktB1}$, $f_{transB1}$ or weights $w_{iB1}$. The second evaluation unit 840 is set up to determine the second evaluations (output22) from the second situation data Y(t4). The function of the second evaluation unit is determined by parameters, in particular functions $f_{outB2}$, $f_{aktB2}$, $f_{transB2}$ or weights $w_{.iB2}$ The coupling between the two working units 810, 820 or between the two evaluation units 830, 840 corresponds to that explained in connection with FIGS. 1 to 6. Thus, on the basis of the first output values (output11) of the first working unit 810, modulation functions $f_{mod1\_f}$, $f_{mod1\_w}$ are formed, by means of which parameters (functions $f_{outA2}$ $f_{aktA2}$, $f_{transA2}$ and/or weights $w_{iA2}$) of the second working unit 820 are modulated, so that the function or the extraction of output values (ouput12, second output values) of the second evaluation unit is influenced. Likewise, on the basis of the first evaluations (output21) of the first evaluation unit 830, third modulation functions $f_{mod3\_f}$, $f_{mod3\_w}$ are formed, by means of which parameters, (functions $f_{outB2}$, $f_{aktB2}$, $f_{transB2}$ or weights $w_{iB2}$) of the second evaluation unit 840 are modulated, so that the function or the determination of output values (Ouput22, second evaluations) of the second evaluation unit is influenced.

The overall system preferably again comprises a projection level 850, for which what was said in connection with FIG. 7 applies. In addition, an optional memory element is assigned to the projection level 850 as a projection memory 852, in which data, in particular situation data, but also the first and second output values, from or by the projection level can be stored at least temporarily. The storage period for this data may be generally determined, for example, but may also be determined by one of the units, for example by the first evaluation unit. Depending on the embodiment, the projection level memory can essentially serve as a short-term memory, the contents of which can be checked, deleted, overwritten and/or transferred to other memories, such as the memory elements of the respective neural networks or units, as required. Thus, the projection memory 852 can be designed, for example, as a ring memory in which the memory is "full" in each case after a certain number of entries or a certain amount of data and therefore the previous data is overwritten from the beginning, which corresponds to a ring structure.

Likewise, the embodiment shown again comprises an overall sequence memory 860, for which again what was said in connection with FIG. 7 applies. The dashed lines again indicate that the total sequence memory 860 can receive data from both working units, both evaluation units and the projection level or exchange data with them, and the units can preferably also access the data stored in the total sequence memory.

The influence of the work level (i.e. first and second work units) or the first and second output values formed by them by the evaluation level (i.e. first and second evaluation unit) or by the first and second evaluations formed in it is implemented as follows.

According to the embodiment shown in FIG. 8, it is intended to influence the first working unit 810 by the first evaluations (output21) of the first evaluation unit 830. This can be achieved on the one hand by using the first evaluations or values derived from them as additional (in addition to $X_i$ (t)) input values of the first working unit 810, these can be called first evaluation input values. In this case, the first evaluations should be initialised with neutral values at the beginning of the analysis of input values $X_i$ (t), e.g. with values indicating that all first conditions are fulfilled. Such an initialisation with neutral values can also be carried out again in the further process, for example if the input values change significantly or if the dominance passes from one of the working units to the other (in particular from the second to the first working unit), a temporal control is also conceivable.

In addition or alternatively, the first evaluation unit 830 can preferably be coupled to the first working unit 810 according to the coupling described above, in particular in connection with FIGS. 1 to 6. Thus, on the basis of the first evaluations (output21) of the first evaluation unit 830, second modulation functions $f_{mod2\_f}$, $f_{mod2\_w}$ can be formed, by means of which the parameters, i.e. functions $f_{outA1}$, $f_{aktA1}$, $f_{transA1}$ and/or weights $w_{iA1}$, of the first working unit 810 are modulated, so that the function or the obtaining of output values (Ouput11) of the first working unit is influenced.

Furthermore, the second evaluations influence the function of the second working unit 820. This can be done by using the second evaluations or values derived from them as additional (in addition to $X_i$ (t)) input values (second evaluation input values) of the second working unit 820. In this case, the corresponding second evaluations should be initialised with neutral values at the beginning of the processing of input values $X_i$ (t), e.g. with values indicating that all second conditions are fulfilled. Such an initialisation with neutral values can also be carried out again in the further course, for example if the input values change significantly or if the dominance passes from one of the working units to the other (in particular from the first to the second working unit), also a time control is again conceivable.

Further (not shown in the figure), based on the second evaluations (output22) of the second evaluation unit 840, fourth modulation functions $f_{mod4\_f}$, $f_{mod4\_w}$ may be formed by means of which parameters, i.e. functions $f_{outA2}$, $f_{aktA2}$, $f_{transA2}$ and/or weights $w_{iA2}$, of the second working unit 820 are modulated so as to influence the function or the obtaining of output values (Ouput12) of the second working unit. However, the set of parameters (functions and/or weights) of the second working unit modulated by the fourth modulation functions should be disjoint from the set of parameters (functions and/or weights) of the second working unit modulated by the first modulation functions. Thus, the second evaluation unit should only modulate parameters (functions and/or weights) of the second working unit that are not modulated by the first working unit. This is advantageous to prevent instabilities. If the second working unit is a neural network with several hidden layers, such as can be used in so-called "deep learning", for example, one or more input-side layers can be modulated by means of the first modulation function (i.e. functions and/or weights of the neurons of the layers are modulated) while one or more output-side layers are modulated by means of the fourth modulation functions. Figuratively speaking, the first working unit with the first output values by means of the first modulation functions would then influence the basic analysis of the input values in the second working unit, while the second evaluation unit with the second evaluations by means of the fourth modulation functions would influence the classification of the results obtained by this basic analysis in the second working unit.

The working units 810, 820 and the evaluation units 830, 840 can each have a memory, in particular a classification memory, in which the classifications or conditions are stored. The corresponding memory structure was explained in detail in connection with FIG. 5. In FIG. 8, a memory 842 is drawn only for the second evaluation unit 840 as an example. The memories can be designed separately from the units or can also be included in the respective unit.

The memory 842 of the second evaluation unit (and also a corresponding memory of the first evaluation unit) may comprise (in addition to a classification memory) a sequence memory, more specifically a second sequence memory, which is used to store sequences of evaluations. In the case of the second evaluation unit, this involves storing one (or more) second evaluation sequence comprising second evaluation sets each comprising sets of input values (second situation data) of the second evaluation unit and the second assessments obtained therefrom by the second evaluation unit. The evaluation sets may be provided with respective time information and/or numbered by means of numbering and/or arranged according to their order. Likewise, in a memory of the first evaluation unit 830 not shown, a first sequence memory may be comprised, which serves analogously to store first evaluation sequences comprising first evaluation sets, which respectively comprise sets of input values (first situation data) of the first evaluation unit and the first evaluations obtained therefrom by the first evaluation unit.

Both the working level and the evaluation level can comprise further artificial learning units, each of which is coupled as in FIG. 6. The working level could thus comprise a third (and possibly a fourth, fifth, . . . ) working unit that is coupled to the second working unit (or to the respective preceding one) by means of modulation functions that are determined by the output values of the second (or preceding) working unit. Likewise, the evaluation level could comprise a third (and possibly a fourth, fifth, . . . ) evaluation unit, which is coupled to the second evaluation unit (or to the respective preceding one) by means of modulation functions, which are determined by the evaluations of the second (or preceding) evaluation unit. The interaction between corresponding nth working and evaluation units can then take place like the interaction between second working and second evaluation unit, i.e. in particular the nth evaluation unit influences the nth working unit.

Exemplary Processing of Input Values

The resulting processing or analysis of input data is described below by way of example. The input data form input values for the working units 810, 820. The input values can be identical for both working units or different, for example at different times in a time series. The input values $X_i$ (t) can be time-dependent, e.g. a time series of sensor measurement values or a video/audio stream, whereby the working units can receive or accept the input values $X_i$ (t1), $X_i$ (t2) at specific points in time, for example controlled by a timer or by a dominance transition, or also continuously, in particular in the case of recurrent neural networks. The processing units can carry out a continuous processing of the input values or carry out a processing starting at certain points in time, for example timer-controlled or at certain events, e.g. dominance transition.

The first working unit 810 determines first output values (output11) from the input values $X_i$ (t1), from which first situation data (e.g. the first output values themselves or parts thereof or values derived therefrom) are formed by the projection level 850, which in turn serve as input for the first evaluation unit 830, which evaluates these (i.e. the first situation data), i.e. checks whether first conditions are fulfilled, and generates corresponding first evaluations (output21). Based on the first evaluations, the first working unit 810 or the output (output11) is influenced.

If it is determined (on the basis of the first evaluations) that the first conditions are not fulfilled or are only fulfilled to a certain degree, the input values $X_i$ (t) can be processed again by the first evaluation unit 810, whereby the influence by the first evaluations is now taken into account (for example by the second modulation functions determined from the first evaluations or by using the first evaluations or values derived therefrom as additional input values), so that generally modified first output values (output11) result, which are influenced by the first evaluations, in particular with appropriate training of the first working unit.

This may be iterated several times until it is determined that the first conditions are met, at which point the first output values may be used as the (total) output or total output values of the system. Subsequently, the input values may then be processed by the second evaluation unit 820 and/or dominance may pass to the second evaluation unit. The second output values thus generated may then additionally or alternatively become the total or overall output, possibly depending on the dominance.

Alternatively or additionally, if for example it is not possible to fulfil all first conditions or only a limited time period is available, for example in a real-time system, the processing by the second working unit 820 and/or the dominance of the second working unit may preferably also be terminated after a predetermined period of time (controlled by a timer), after a predetermined number of iterations has been reached, when the first output values no longer change within predetermined tolerances between two successive iterations, or when the first evaluations no longer change within predetermined tolerances between two successive iterations. Combinations of these are also conceivable.

If dominance passes back to the first working unit 810, for example in the case of substantially changed input values $X_i$, this process or evaluation can be carried out again by the first evaluation unit 830, if necessary after initialisation of the first evaluations.

Optionally, especially if the second working unit 820 dominates, situation data could also be formed by the projection level 850 on the basis of the second output values (output12) of the second working unit 820 and evaluated by the first evaluation unit 830, i.e. it is checked whether the second output values are in accordance with the first conditions. If this is not or only partially the case, the second working unit could also be influenced by the (now changed) first evaluations, analogously to the influencing of the first working unit by the first evaluations, whereby no modulation functions should be used here, in particular none that modulate parameters, i.e. functions $f_{outA2}$, $f_{aktA2}$, $f_{transA2}$ and/or weights $w_{iA2}$, of the second working unit 820 that are modulated by the first modulation functions.

The first evaluations formed by the first evaluation unit 830 also indirectly influence the function of the second evaluation unit 840 via the coupling, i.e. by means of the third modulation functions $f_{mod3\_f}$, $f_{mod3\_w}$.

The second evaluation unit 840 receives as input values second situation data formed in the projection level 850 (which need not be identical to the first situation data received by the first evaluation unit 830). Preferably, this second situation data is formed on the basis of the second output values (output12) of at least the second artificial learning unit 820, i.e. the second situation data may comprise some or all of the second output values or also values derived therefrom; whereby, further, the situation data may also be formed at least partly on the basis of the first output values (output11) of the first artificial learning unit 810 or other values.

When the second working unit 820 processes the input values $X_i$ (t2) and/or dominance has passed to the second working unit, second situation data is formed by the projection level 850, which is based at least in part on the second output values (output12) of the second working unit 820. This second situation data serves as input values for the second evaluation unit 840, which forms second evaluations therefrom. If the second evaluations indicate that all second conditions are met, the second output values can be used, for example, as the total/overall output of the system.

By influencing the second working unit by the second evaluations, generally, at least if the second evaluations indicate that not all second conditions are fulfilled and the second working unit has been trained accordingly, modified second output values (output12) result, from which modified situation data are then formed by the projection level, if necessary, which are checked by the second evaluation unit and lead to modified second evaluations.

This can be repeated in several iterations until, for example, a predefined number of iterations is reached, a predefined period of time has elapsed or the second output values no longer change within predefined tolerances between two successive iterations. Combinations of these or other conditions are also conceivable.

The interaction between second evaluation unit 840 and second working unit 820 thus corresponds to the interaction between first evaluation unit 830 and first working unit 810. In addition, however, due to the coupling of the two evaluation units, the evaluation by the second evaluation unit 840, i.e. the second evaluations, is influenced by the first evaluations obtained by the first evaluation unit 810. Accordingly, the timing is preferably controlled in such a way that first the interaction between the first working unit and the first evaluation unit takes place and then the interaction between the second working unit and the second evaluation unit takes place.

Even though the processing of input values has been presented above as a process of successive processing steps in the individual artificial learning units, it should be noted that the units (first, second working unit, first, second evaluation unit) can in principle work asynchronously to each other, i.e. each unit can work according to its own speed, using the input data or modulations (which are partly outputs of other units) that are currently available. A time synchronisation can, but does not have to, be provided. The units can work in parallel with each other accordingly.

Training

An exemplary training of the entire system is described below. As explained above, in supervised learning, input values and corresponding (i.e. associated with respective input values) desired output values (i.e. known training data) are given and an error is minimised during training with respect to an error measure indicating the deviation between output values determined by the artificial learning unit and the desired output values. A typical error measure used is a mean (possibly weighted) squared error. Parameters of the artificial learning unit (e.g. weights) are varied during training to minimise the error. This procedure is known to the skilled person per se.

The system is trained in such a way that first the working level and the evaluation level are trained individually. These represent "artificial/artificially learning systems", the training of which was explained in connection with FIGS. 1-5. Thus, in the aforementioned supervised learning, when training the working level, input values (comprising sensor data) are used as input values and corresponding (known) desired output values (control parameters, state parameters) are used as output values, and when training the evaluation level, situation data (formed from the output values or control parameters/state parameters) are used as input values and corresponding (known) desired evaluations (indicating to what extent conditions are fulfilled) are used as output values.

Further, during the coupled operation of the working and evaluation levels, conditions can be adapted or supplemented (see below). This process can be seen as joint learning of the working and evaluation levels, i.e. of the entire system.

With respect to the working level and the evaluation level, referring to the embodiment shown in FIG. 8, in each of the two levels a first 810, 830 and a second 820, 840 artificial learning unit are included, which are coupled analogously to FIGS. 1-5. Here, within one level, in particular, an independent training of each of the two (first/second) units (i.e. individually and independently of the coupled unit) is initially performed, whereby the same training data set of input values can be used for both units or different training data sets of input values can be used. What is different between the first and the second unit are the associated desired output values (which correspond to the input values, i.e. which should preferably be achieved in the training), whereby the desired output values of the second unit preferably represent some kind of refinement of the desired output values of the first unit. For example, it could be envisaged that the desired output values of the first unit are a true (non-trivial) subset of the desired output values of the second unit, also it could be envisaged that different weights for deviations of certain output values are used in the error measure. Further, a joint training of the coupled (first/second) units can be performed. Here, the errors of the first and second unit can be included, whereby the errors of the first and second unit can be weighted differently. In the joint training, the correlation of the output values of the first unit with the modulation functions via which the second unit is influenced can also be generated.

First/Second Sequence Memory

Saving the first/second evaluation sequences makes it possible to track the "decisions" of the evaluation units and, if necessary, for example if they do not work or function as desired, to carry out further training using the evaluation sequences.

Further, an evaluation unit 830, 840 can perform a comparison of entered situation data Y(t3), Y(t4) with evaluation records stored in the sequence memory in evaluation sequences or sets before or in parallel with the determination of the evaluations (output21, output22), i.e. the entered situation data is compared with corresponding situation data in the stored evaluation records. If these are found to be the same or similar, i.e. the same or similar situation data has occurred at an earlier time, earlier evaluations can be read from the scoring sequence and used as output, i.e. evaluations for the current situation data. In particular, the evaluation record in which the same or similar situation data occurred and, if applicable, evaluation records following it in the corresponding evaluation sequence can be skipped. Thus, earlier evaluations are used as current evaluations for the entered situation data Y(t3), Y(t4), which are taken from an evaluation record that occurred at a later time in the respective evaluation sequence (for this purpose, the evaluation records are advantageously provided with time stamps, numbered and/or arranged according to the order of their occurrence). "Similar" is to be understood in the sense of suitably selected tolerances in each case.

A maximum number of evaluation records can be skipped until the assessments indicate that a predefined number of skipped evaluation records has been reached and/or time information indicates that a predefined period of time has elapsed within the evaluation sequence and/or in the respective evaluation sequence the input values of the evaluation unit (situation data) are unchanged within predefined tolerances compared to the previous entry in the evaluation sequence. This procedure can lead to an acceleration of the process flow.

The storage of the first and/or second evaluation sequence in the first or second sequence memory is preferably carried out in cryptologically secured form in order to protect it from manipulation. In particular, the use of a blockchain is provided for this purpose, whereby the entries of the sequences (e.g. one or more evaluation records for the first evaluation sequence) form the blocks of the blockchain. A block thus comprises at least one valuation record in each case and is linked to the sequence of previous valuation records stored in previous blocks according to the blockchain principle.

Complexity Structure

It is preferably provided that the complexity structure of the working level and the evaluation level are designed as described in particular in connection with FIGS. 1 and 5, i.e. that the first working unit carries out a relatively coarse analysis or division of the input values into relatively few classes and, in comparison, the second working unit carries out a relatively fine analysis or division into relatively many classes or subclasses and further hierarchy levels and that the first evaluation unit also checks whether the first situation data or the first output values fulfil relatively coarse conditions and the second evaluation unit checks whether the first situation data or the first output values fulfil relatively coarse conditions. in that the first evaluation unit also checks whether the first situation data or the first output values fulfil relatively coarse conditions, and the second evaluation unit checks whether the second situation data or the second output values fulfil relatively fine conditions in comparison.

The first evaluation unit 830 can be assigned a classification memory (not shown) that is designed with comparatively few levels and classes. In the present example, it is assumed that the number of levels and/or classes for the first evaluation unit 830 is significantly smaller than for the second working unit 820, which is provided as an analysing unit, e.g. smaller by one or more orders of magnitude, for example. Similarly, the number of levels and/or classes for the second evaluation unit 840 may be significantly greater than the number of levels and/or classes for the first evaluation unit 830. Also, the number of levels and/or classes for the second work unit 820 may be significantly greater than the number of levels and/or classes for the first work unit 810. The memories may also differ further, but in this case a clear asymmetry between the memory sizes and complexities will usually prevail.

Adjusting or Supplementing Conditions

As explained in relation to FIG. 7, there may be cases where the overall system fails to find first/second output values, i.e. an overall output, such that first/second situation data is derived that is consistent with all first and second conditions respectively. Due to the dominance transition from the first to the second working unit and correspondingly from the first to the second working unit, this particularly concerns the second output values or second situation data, which represent the ultimate overall output of the system.

It is therefore preferably intended to carry out a change or supplementation of the conditions, preferably of the second conditions, so that for at least some of these cases, the corresponding output values or situation data the supplemented conditions are considered to be fulfilled. Thus, an adaptation of the system takes place that influences the processing of future input values.

Preferably, however, such an addition of conditions is not carried out for all of the cases for which not all conditions can be fulfilled, but only when certain conditions are fulfilled. One possible condition is that only a certain number or percentage (e.g. 20% or 10% or 5%) of all conditions cannot be fulfilled, but the others are fulfilled.

Addition of conditions can be effected during normal processing of input values and/or at certain time intervals using the total sequences stored in the total sequence memory. If stored total sequences are used, it can be used as a prerequisite for supplementing a condition that the condition was not fulfilled in a certain minimum number (e.g. 10, 50 or 100) of total sequences of the same type (within certain tolerances), i.e. that for these total sequences the condition is considered fulfilled when supplementing the condition with a supplementary condition (according to the type of non-fulfilment, including possible tolerances) is carried out.

In a simple example of an evaluation unit that is a neural network, when a condition is added/changed, a range of values could be added to an output of a neuron that corresponds to the condition. So here the neuron is assigned to one of the conditions. For example, the neuron has an output function so that the output of this neuron as a numerical value is in the range between −1 and +1. In an initial training, the network might have been trained so that this neuron outputs a value in the interval from −0.1 to 0.1 if the condition is fulfilled and, if the condition is not fulfilled, lies outside this range. If the case now arises that the condition for an output of the working level is not fulfilled, i.e. that the neuron outputs a value R that does not lie in the interval [−0.1; +0.1], and if the condition is to be supplemented, the value R can be added to the interval as a valid value. Preferably, not only the value R itself but also a small range around the value R is added, e.g. R±0.01. The reason for the addition of this condition could be that one of the above conditions is fulfilled, e.g. that this condition was the only one or one of a few that was not fulfilled, or that an output in the range R±0.01 occurred in several total sequences.

There are then two intervals, namely [−0.1; +0.1] and [R−0.01; R+0.01]. If, when processing future input values, the output of the neuron lies in one of these two intervals, the corresponding condition is considered fulfilled. More intervals can be added to these two intervals in the case of further additions, so that the condition is represented by a set of intervals. These intervals can be stored in the classification memory of the evaluation unit.

Of course, analogously to this example, a condition can also be associated with multiple neurons, in which case the outputs of the neurons lie in a total value range that is a subset of an n-dimensional space, where n is equal to the number of neurons associated with the condition. The condition is then considered satisfied if the outputs of these multiple neurons lie in one or more subsets (corresponding to the intervals in the preceding example) of the total value range. These subsets can then be completed in the same way.

The original condition and each addition to the condition can additionally be provided with the indication of a level S, which can be stored together with the condition/addition in the classification memory of the evaluation unit. The original could be, for example, the 0th level, S=0. Additions would then have a higher level, S>0. The associated evaluation can then additionally indicate to what degree the condition is fulfilled, for example, by specifying the level. Or by specifying a corresponding value, such as $0.9^{s}$ (or another real value smaller than 1 instead of 0.9) the value 1 would thus correspond to the case that the original condition is fulfilled, a complete fulfilment of the condition, so to speak. Additions (S>1) would only fulfil the condition to a certain degree ($0.9^s<1$) according to their level.

The level of an addition can be determined depending on which and/or how many conditions that cause the addition are fulfilled. For example, if the prerequisite is that only one or a few conditions are not fulfilled, the level could be equal to the highest level of fulfilled conditions plus one.

Through the stages or levels, a hierarchy of conditions is introduced, so to speak, with which the original condition becomes more and more refined or ramified. Depending on the level or the corresponding degree, certain output values are then preferred through the evaluations, again by influencing the working level.

Such a procedure could in principle be carried out for both the first and the second conditions. However, it is preferable that only the second conditions are supplemented or changed. The first conditions, on the other hand, should remain unchanged; these represent, so to speak, basic, unchangeable conditions. In the example of conditions as moral contracts mentioned above (in the disclosure of the invention section), the first, absolute considerations would accordingly be immutable, while the second, relative considerations could be changed over time, depending on actual total output values. When using the method in a machine control, a machine morality would evolve, so to speak.

Compatibility Check with Other Systems

Further, when two overall systems communicate with each other, a first overall system can be enabled to assess to what extent overall output values and/or assessments of a second overall system are compatible with its own assessments, i.e. consistent with the first and second conditions.

According to a first embodiment, the second overall system transmits overall sequences, which typically comprise several overall records, to the first overall system. The first system then uses input values and/or situation data included in the overall sets as input values/situation data for its own work or evaluation levels and compares the first/second evaluations and/or first/second output values obtained therefrom with corresponding values included in the transmitted overall sequences. If these at least partially match, the first overall system can consider the second overall system as trustworthy or compatible (i.e. not contradicting the first/second conditions) and classify e.g. analysis data received from it (i.e. data obtained by the work units) as correct or compatible and use them in its own processing. Otherwise, the received data is classified as incorrect or incompatible and is not used or only used to a certain extent. The received data can be data that is used as input values in the overall system. For example, if the two overall systems are included as control systems in two autonomous vehicles, the data could include speed, braking and the like. If one vehicle is travelling at a distance behind the other, it may choose this distance depending on the trustworthiness/compatibility of the overall system in the vehicle ahead (the conditions checked by the evaluation unit here would include, for example, vehicle-specific braking deceleration in the event of sudden braking, which may vary from vehicle to vehicle).

According to another embodiment, which may be used alternatively or additionally, a compatibility check may be performed in a question-answer process. In this alternative, the second overall system does not need to have an overall sequence memory, but only needs to be a system that generates output values from input values. For this purpose, the first overall system takes one or preferably several overall sequences from its overall sequence memory and transmits the input values (question) contained therein to the second overall system for each overall sequence. The second overall system processes these and determines output values based on them, which it transmits to the first overall system (answer). The first overall system feeds this answer into its projection level, or possibly directly into the evaluation level, and determines first/second evaluations through the evaluation level. This is repeated for all overall sequences. If the evaluations for all total sequences show that the first/second conditions are fulfilled, the second total system is classified as compatible. Alternatively or additionally, a comparison of the evaluations determined from the response of the second overall system with the corresponding evaluations contained in the overall sequences can also be carried out, whereby the second overall system is classified as compatible if only minor differences, e.g. within predefined tolerances, are found in the comparison.

A significant advantage of these approaches is also that the conditions themselves are not disclosed to the other system. This is an advantage, for example, if the conditions codify moral-ethical rules which as such should not be publicly accessible, especially if they have been adapted or supplemented as described above. The same applies to economic aspects, which may concern trade secrets, for example.

The possibilities of a compatibility check described above presuppose, of course, that the meaning of the input and output values of the second overall system is known to the first overall system so that it can assign them to the inputs/outputs of its own working and evaluation units. In the case of autonomous vehicles, this assignment could, for example, be manufacturer-specific or given in standardised form as a specification or implemented as an interface.

Further Information on the Projection Level

The evaluation units are trained to evaluate situation data present in or formed by the projection level 850. The situation data can be, for example, as already mentioned, input data, and/or output data from one of the two working units 810, 820, and/or further data. For example, only output data, optionally with additional information, could also be processed in the projection level 850. However, it is preferred that no input values $X_i$ (t) of the working level are used in the projection level. It is further preferred that only the output values (Output11, Ouput12) of the working units 810, 820, i.e. the working level, are used to form the situation data. In this way, the projection level achieves a separation of the evaluation level from the work plane, whereby the input values X(t) of the work units are not visible to the evaluation units, so that an evaluation of the output values of the work units by the evaluation units can take place in independent form.

Furthermore, it is possible that the data is processed or e.g. simplified in some way before the projection level. In response to the processing of the situation data by the evaluation units, which corresponds to a classification or evaluation, various actions can be carried out, in particular influencing the working level, which have an influence on the final output values of the overall system and the associated signals to actuators, output interfaces and others, and/or actions that influence the further behaviour of the overall system and in particular the other units that are included in the system.

It is also conceivable to link the data in the projection level with each other so that at least one additional piece of information results. Furthermore, there can be temporal parameters that indicate, for example, at what time a certain output value was output. Such temporal parameters could include an absolute time indication, but also a relative time indication depending on the current evaluation time or another reference time. Likewise, not a fixed point in time could be specified, but a temporal section to which one or more input and/or output values of the units are assigned. In addition or alternatively to an actual temporal parameter, a sequence can be associated with at least part of the data, so that even without an explicit time specification in the projection level it is recognisable in which sequence several data values present were generated or processed, e.g. in the form of an assigned numbering for the output values in the projection level.

In this way, the data present in the projection level, in particular the output values of the working units, can form temporal sequences, for example. Optionally, such sequences can also be marked so that, for example, it is specified that a certain time period or specified output values belong to a defined sequence. For further processing, storage or evaluation, sequences formed in this way can then be treated as a whole. Alternatively, different input and/or preferably output values that belong to the same time period or to the same sequence can be processed together, for example compared with each other. By placing the data in the projection level in time and grouping them into specific processes and sequences that can be accessed again, a memory-like construct can be made possible. A timer can be provided (not shown), which can also be used in this system according to the idea described in connection with FIG. 4, to control the dominance between the working units.

The memory 852 preferably provided for the projection level 850 can, for example, be designed as a volatile memory element or as a non-volatile memory element in the form of a ring memory or another short-term memory. The data to be processed in the projection level 850 may be stored in this projection memory. The storage duration of the data and the choice of the data to be stored can be designed very differently. For example, a fixed storage period can be specified initially. After this time has elapsed, the data in the projection memory can be discarded and/or overwritten. Additionally or alternatively, a part of the system, for example one or both of the evaluation units 830, 840, may make decisions as to whether the data in the projection memory is at least partially passed on to another element of the system. To prevent loss of data, this decision may be made before the predetermined storage period has expired. For example, one of the evaluation units may decide that some or all of the data stored in the projection level 850 or projection memory should be passed to another storage element for long-term storage. This can, for example, also be one of the storage elements of the working units. By storing in a memory of the other units in the system that later evaluate new situations, situations that have already been evaluated can thus be incorporated in a similar way to experiences made. In principle, however, a separate memory module (not shown) could also be provided as a long-term memory, in which it can be fixed or definable by one of the units which unit can access the data stored there and to what extent.

Further details and embodiments of the invention are explained below. Based on the first and/or second evaluations, it can be decided whether the first and/or second output values of the first and/or second working unit are within valid ranges or parameters or whether they fulfil certain normative rules, i.e. whether they are permissible as a valid (in the sense of the conditions or rules) solution or are permissible at least to a certain degree. If it is determined here that, for example, the current output values of the first and/or second working unit, which were determined as the total output value of the system in the previous examples, lie outside permissible ranges, a reaction of the overall system can be prevented or stopped on the basis of this evaluation, so that the previously obtained first/second output values of the first/second working unit are not passed on to actuators or interfaces, for example. The output values evaluated as inadmissible or invalid can then be discarded, but can also be stored together with this evaluation in order to be able to fall back on them in later situations, for example by comparison. In this way, evaluations of situations detected later can be simplified or accelerated by not pursuing solutions that have already been recognised as invalid or by only pursuing them with lower priority. Alternatively, the first/second output values can also be used as an overall output, for example if no solution that fulfils all conditions can be found, whereby the interaction between the working and evaluation levels according to the invention ensures that a best possible solution is found.

Output values and solutions can not only be checked for admissibility, but also whether they correspond particularly well to certain conditions or specifications, i.e. represent the most ideal solution possible. The output values found in this way can then preferably be used as the overall output of the entire system, or can be stored in a long-term memory, for example, in order to be able to quickly retrieve the best solution found in the future. Conversely, output values that have been evaluated as particularly disadvantageous or advantageous could also be provided with a corresponding evaluation parameter, which can also be stored and/or further transmitted linked to these values. These evaluation options can be implemented individually or in combination with each other.

For example, the decision to transfer and store data from projection level 750, 850, described earlier, can be made based on such assessments by the evaluation units.

In a further embodiment, it is also possible that initially only the input values of the system that are used as input values of the first and second working unit are stored in the projection level or its associated memory 752, 852. This can be considered as an unprocessed image of a current situation. At the same time, the first and second working units start processing these input values as described before, i.e. using different possibilities such as changing the dominance between the working units and modulating the determining parameters and functions of the second working unit.

The solutions found, i.e. the output values of the first and/or second working unit, can then be transferred to the projection level, whereby they can either overwrite the respective associated input values or can also be stored and linked together with them. Depending on the variant, for example, each newer result obtained from the same input values can overwrite an older result. In other cases, the results can be transferred to the projection layer while retaining older solutions, so that, for example, a comparison of current and previous solutions can also be used to evaluate whether a later or earlier result better corresponds to the specifications or conditions of the evaluation system. As an example of a link, simultaneously superimposed elements or also superimposed elements can be considered, as far as pictures are concerned, for example.

Optionally, the previously described dominance between the coupled units can also be taken into account, so that, for example, only the output values of the currently dominant network are processed and stored in the projection level or its memory. In the process, temporal parameters can again be linked to the values. For example, time segments with the same or different lengths can be defined, to which the respective input values and output values are then appropriately assigned in order to reproduce a temporal sequence of a situation. For example, in a first time period the input values could be stored, while in a next time period output values of the first working unit are stored and then output values of the second working unit. Further, improved or at least changed output values can then be stored in further sections. A time period can be specified for each block of output values, which can optionally be marked as belonging together in order to clarify the sequence of a recognised situation.

In exemplary embodiments, control over the storage of data in or from the projection memory can also be at least partially assumed by several units of the system. For example, a situation has already been described in which, in a system with defined dominance of the units, it is checked whether the input values change beyond a predefined level so that a new situation is assumed. In this case, the dominance can pass to the first working unit to create a new rough classification of the input values. At the same time, the first working unit can then give a signal to the projection memory indicating whether the data stored there (corresponding to a previous situation) should be transferred to another memory element, e.g. the long-term memory, or whether it can be overwritten later. Similarly, depending on a current processing operation, the first and/or second working unit could adjust the storage duration in the projection memory to respond to different situations or goals. For example, a longer storage duration in the projection layer can be set if a long, in-depth solution search is required, while rapid decisions can lead to quick changes in the stored data.

Optionally, it is also possible that one of the units can decide with priority on, for example, the storage duration, so that, for example, a decision by the first working unit to discard previous data in the projection memory can be checked or blocked by the second working unit, so that the respective data is nevertheless stored, e.g. in the case of recurring input values. Furthermore, it is also conceivable that, at least to a limited extent, one of the units can make changes to the classification memory of another unit and, for example, create new categories. However, protected areas can also be defined in which all defaults are stored that may not be changed or deleted by any unit.

If, as in the system shown in FIG. 4, a timer is specified that is able to measure time intervals and pass this information on to units, this timer can, for example, also monitor the specified storage duration. In this way, the storage times can also be coordinated or synchronised with the dominance distributions between the different units of a system. Alternatively, however, another part of the system can be provided for this purpose. In principle, evaluation units can also change and redefine the predefined storage period. In doing so, different specifications for the storage duration can also be defined for different values. For example, it is possible to specify that the output values of the first working unit, which is, for example, a fast categorising unit, are only stored for a short time in the projection level, so that a first time specification for the storage duration is defined for them, while the output values of the second working unit are provided with a longer time specification for the storage duration. It is also possible that the output values of the first working unit are only stored until output values of the second working unit are available. Optionally, a check of the output values by the evaluation units could be waited for first. If it is determined that the output values of the second unit are not valid because they do not correspond to the predefined conditions, the storage of these values can be cancelled, while the rough output values of the first working unit continue to be retained.

In addition or alternatively, the evaluation units may also further modify the modulation detailed between the first and second units based on their performed evaluation.

The system can be designed in such a way that the evaluation system does not decide alone on the validity or invalidity of results and output values, but in combination with the other units of the system, for example by influencing the processing parameters, storage times and other elements.

Insofar as the evaluation units, i.e. the evaluation level, is designed as evaluating or validating units, these can, for example, include classifications that essentially contain features such as prohibitions, priorities, normative rules and value-like specifications. By having such an evaluation level evaluate the output values of the working level, it can be ensured that only those solutions are approved for the overall system that comply with these specifications. These could be simple fixed boundary conditions of a system; but they could also be further developed into an ethics-like module that keeps the development and decisions of the overall system in a direction given by values and rules. These boundary conditions, which are predefined inter alia by classifications in the evaluation level, can preferably be firmly defined and stored for the first evaluation unit without being changeable by the system and preferably be changeable for the second evaluation unit starting from predefined conditions. It is therefore also conceivable that a system learns these classifications at least partially itself in the interaction of the working and evaluation units, i.e. corresponding to a non-supervised learning, so that at least partially its own value system or a learned set of boundary conditions is formed. Designs can also be used in which a basic system of non-changeable boundary conditions is predefined, which can then be supplemented in the course of a training phase or during operation and/or by external data input.

The conditions specified by the evaluation units can be applied both in a joint training phase of the coupled networks and in the later evaluation phase of an previously trained system. Optionally, the classification memories of the evaluation units could contain several separate preset settings corresponding to several closed groups of classifications. If required, one of these groups can then be selected, for example depending on the situation at hand. The recognition of the respective situation at hand and the assignment of the classification groups to be applied can again be based on the results of the first and/or second working unit. In this way, for example, different risk appetites or "basic moods" of a system could be implemented. In this case, a basic setting can also be predefined, which is only changed in certain cases. It is also conceivable that new classification groups with additional or flexible boundary conditions for the evaluation level are actively formed from the unchangeable basic setting of the evaluation level in training and operating phases of the coupled system.

As an example, in the case of an autonomous vehicle or aircraft used to rescue people (e.g. an aerial drone), a riskier driving style may be permitted as long as no passengers are being carried, especially if the vehicle is to arrive quickly at a predetermined location. After a rough recognition of the situation, e.g. "alarm situation", which can be carried out by the first working unit, for example, a corresponding classification group can thus be selected for the first evaluation unit, on the basis of which the solutions or output values are then preferably evaluated by the first and/or possibly also by the second working unit. Analogously, a possibly finer classification group is selected in the second evaluation unit, whereby this selection is influenced by the first evaluations due to the third modulation functions. In this way, basic boundary conditions can continue to be observed, e.g. avoiding accidents, but at the same time other boundary conditions can be relaxed (such as fast cornering, accepting damage, or others). As soon as the system detects a new situation, e.g. the presence of passengers in the vehicle, a different classification group can be applied for the first evaluation unit and for the second evaluation unit respectively, which can now be more focused on the well-being of the passengers or even rescued casualties. In an extended embodiment, further criteria catalogues could then also be created, which can be used for classification in specific situations, for example for load transport, during fire fighting, during a reconnaissance flight or a reconnaissance trip, and others. If situations can be classified as such known situations, the evaluation level can then be limited to maintaining the validity of the boundary conditions and, as long as no contradictions occur, remain passive. If, however, more complicated or unknown situations arise that may result in damage or other undesirable consequences, the evaluation level can also intervene more actively in the solution finding of the working level and, for example, specify new search spaces, change or modulate parameters of the working units, or otherwise support the finding of a suitable solution.

In this way, the framework conditions of the overall system, such as prohibitions, priorities and a value system, are thus located in the memory of the evaluation level, preferably permanently programmed for the first evaluation unit and modifiable to a certain extent for the second evaluation unit. Processing acceleration can also be achieved by excluding certain solutions. The evaluation level can actively intervene in the solution finding of the working level through actions such as reward and punishment or by inducing new step sizes. Thus, the output values of the working level are also influenced by the evaluation level through a special type of feedback.

As a further option, the evaluation level can influence a timer and the associated determination of the dominance of individual units in the system, preferably in the working level, which is implemented in a system of several coupled units as already described in connection with FIG. 4. For example, the evaluation level can check whether the specified time parameters for the transfer of dominance lead to sensible results or whether a different distribution or specification of the time periods should be specified. This makes it possible, for example, to react flexibly to situations that require more rough categorisations than usual and, for example, have to be decided in a shorter time. Accordingly, a signal from the evaluation level to the timer module can be used to set one or more new time parameters for each of the coupled artificial learning units, if required, on the basis of which the further determination of dominance is then carried out as already described. Similarly, after time evaluation of the situation data, the evaluation level could determine that the input values and thus the situations to be evaluated change massively very quickly, or that the situation remains unchanged in a quasi-static manner for a long time, and on this basis prescribe other time parameters for processing.

The elements and process steps described in FIGS. 7 and 8 are of course not intended to be limited to the embodiment shown with four artificial learning units. In all embodiments, it is understood that the individual elements, e.g. memory elements, artificial learning units (neural networks), connections between these elements and further can also be implemented differently than shown here. For example, further memory elements can of course also be present that are not shown in these schematic illustrations, or some or all of these memories can be in the form of a single physical memory element, e.g. subdivided accordingly by addressing.

The various sub-approaches described above can, especially in combination with each other, lead to an associative and independently acting system. Such systems can cover a much broader range of applications than intelligent systems trained in only one specialised area. In conventional systems, data processing corresponds to finding error minima or success maxima in a multi-dimensional space. The more dimensions (through classifications, options, hierarchical levels) this space has, the more likely the system is to get stuck in local minima or maxima. The previously described coupling and influencing of a second unit by a first unit in the form of modulation functions applied to weights, step sizes, functions and more, on the other hand, allows jumps in the search space into initially unexamined areas that would otherwise never be reached, depending on the defined step size. In the process, the task can also change for a short time, as in each case it is quickly checked whether the new solution space is relevant.

If, for example, a potentially dangerous but non-identifiable animal is recognised from the input values, for which neither the first nor the second working unit can find a suitable image pattern, the system can now jump into a sound analysis by a modulated step size (e.g. stochastically induced) and find a suitable sound there that was recorded by the non-identifiable animal. Now the second working unit modulated in this way can check whether the solution found can be applied to the previously unclassifiable images, which corresponds to an associative performance.

Similarly, the introduction of a projection level can replicate associative behaviour in that now, for example, decisions (in the form of output values) can be compared with previous decisions and optionally also evaluated. Thus, instead of an abstract learning capability based on positive or negative rewards, the evaluation system is completed associatively. If, for example, the system does not find better solutions in the jump area, it can jump back to the area of the best solution so far, which was determined by evaluations in the projection level and optionally stored, and can start a new jump variant. In this way, for example, modulation by a first unit can always be carried out from a suitable starting point found on the basis of the evaluation by the evaluation level.

As a possible application example, a personal AI system adapted to a user shall be considered. Ideally, such a system can develop intelligent behaviour in the sense of hard artificial intelligence by coupling several artificially learning units that include, among other things, the described feedback through modulation as well as an evaluating evaluation level with corresponding storage options. Such a system should preferably be able to associate freely and classify problems independently. In addition, user-specific behaviour should be possible so that the AI system can respond individually to a user, i.e. in particular, it should be able to detect and/or learn which interests, idiosyncrasies, moods, emotions, character traits and level of knowledge the user has.

Herein, such and other externally collected data can be added to the system. Updates to the overall system are also possible, for example to change the working level or classifications and/or the evaluation levels or conditions within certain limits. Preferably, however, mechanisms are in place to completely prevent the export of data from the system, especially since it operates at a very personal level. Personal data should therefore not be disclosed to the outside and optionally also not be accessible. For example, it can also be envisaged that the AI system works primarily offline, i.e. without connection to external communication networks or other interfaces. To update the system or to load background knowledge and other data, a time-limited, secure connection can then be established, which can be completely controlled by the user, for example. Sources of the added data can be specified, for example, and the user can be given a choice of whether to agree to the connection.

An initial training phase for the system can be provided, in which a learning communication with a foreign person, a predefined training data set and/or data not originating from the actual user of the system takes place. This training phase can serve to provide a general basic setting for topics, knowledge, experience and expertise in order to later only have to resort to external data in special cases. A predefined communication character can also be set as well as an initial depth of learning processes and associations for a general state. Furthermore, problem recognition and appropriate reactions to situations as well as associative communication processes can be trained in the training phase.

After completion of this initial training phase, which can be carried out by the manufacturer, for example, a second training phase can be carried out by an end user. Here, for example, the time parameters can now be set to the user (synchronisation). The previously initially set communication character can be adapted to the end user (by mirroring or complementing) by learning and adapting the system from coupled networks. Similarly, the character traits and interests previously set for a general user can now be adapted to the specific end user. Furthermore, in exemplary embodiments, particularly those that include visual evaluation, the projection level may generate and display on a screen a current image of its state. This superimposed image then allows evaluation by an external user or trainer during a work phase and in particular during the training phase, who can use it to determine how the system approximately assesses the current situation. In this way, it is possible to recognise at an early stage how the system is working or, if necessary, to intervene to correct or modify certain aspects and thus accelerate the training phase.

After these training phases, the system is preferably ready for use. However, supplementary training phases can also be used later.

Depending on the embodiment, the AI system may have different interfaces to register environmental conditions and actions performed by the user as well as emotional and mental states of the user. Various sensors can be used for this purpose, such as cameras, microphones, motion sensors, infrared sensors, sensors for chemical compounds (“artificial noses”), ultrasonic sensors, and any others. These can be arranged individually, distributed and/or combined in suitable mobile or static objects to enable the most comprehensive analysis possible. In addition, other interfaces can be provided through which the AI system can communicate with the user, such as loudspeakers for a voice output or screens and other display means for visual displays and text representations.

In one possible embodiment, an object is provided in which such an AI system is integrated for a user. This can be a mobile object, such as a technical device (e.g. smartphone), but in particular also an item of furniture or an object of daily use, such as a lamp, a vase, a screen, a mirror or other objects that already have a fixed place in a home. The task of the system is to be an artificial personal intelligent companion for the user person. The system establishes the identity of the user and communicates with him or her, for example, via speech and/or image if it is a screen or a projection is installed in the room. Accordingly, the output is connected to an interface (e.g. loudspeaker, screen, projector).

Based on the inventive elements described above, the system can classify situations, bring in stored and learned knowledge and associate. The aim is to provide inspiration, give suggestions, bridge loneliness and mood lows of the user, act as a coach or also as a professional advisor/problem solver. Areas of application include use as a leisure companion (helps with boredom, gives impulses for conversation, entertains people, gives life help); as an inspirer who gives intellectual, scientific, artistic impulses; as a coach or advisor to provide psychological or intellectual support, especially for mentally ill people; as an advisor for various everyday situations (fashion, hygiene, health, duties, care); as a personal secretary, whereby an extensive knowledge database can be created and used; as a play partner for the most diverse games; and others.

In particular, such a system can adapt to the user both in the short term, e.g. to a current mood, and in the long term, e.g. to the user’s character type. Among other things, information processed via the projection level and stored in a long-term memory can be used for this purpose. Ideally, the system can be equipped with codes, biometric user recognition (image, voice, fingerprint, tone of voice or other features) and other access control options for this purpose.

Preferably, a moral-ethical system can be implemented with such a system and the described process steps. For example, the personal intelligent companion can encourage satisfying and useful deeds for the user and his environment; it can draw attention to moral-ethical problems adapted to the type, character situation and mood of the user and, for example, propagate certain virtues (helpfulness, generosity, kindness, courage, wisdom).

Through appropriate conditions in the evaluation level, the system can be set up to avoid harm, pain and distress, not only for the user, but for all people affected by their decisions. In the case of expected serious wrong decisions, a personal attendant can start a discussion, especially argue about the consequences of certain courses of action and make constructive suggestions for alternatives. Preference is not given to prescribing actions, but to ideals of how actions should or could be. The personal attendant can identify dilemma situations and point them out to the user, while at the same time looking for alternative solutions or the most favourable solution to choose from. Especially in the context of the user’s artistic work, a personal intelligent companion offers the possibility to support, solely via pre-programmed and learned evaluations. In this context, reflections can already be adapted to the user. The associative ability of the system plays an essential role here.

As a further example of implementation, an “intelligent mirror” is described. There is already a mirror in the entrance area or the bathroom area. The input and output interfaces already described in the previous general example, such as various sensors, can be easily integrated in a mirror. By using an object that a user passes briefly but frequently, a variety of possibilities can be implemented in such an AI system.

For example, suitable cameras, microphones, motion detectors, ultrasonic sensors, artificial noses, infrared sensors and others can be used to collect a variety of information about the user and prevailing situations and user habits without having to actively enter it. Especially in an entrance area, an entrance and exit control can also be implemented.

In this way, an intelligent AI system can alert the user to clothing problems and give clothing recommendations, for example; it can point out the expected weather and necessary utensils if it detects that they are missing. Items carried by a user can be recorded and recognised. If necessary, questions can be clarified in a dialogue with the user (via speech or other input means), e.g. whether something is needed, has been forgotten or lost.

Comments recorded by microphones can also be included so that the user can, for example, actively support these processes by commenting on situations or objects or actively pointing them out for recording. After some time, the AI system can know almost all objects, items of clothing and their whereabouts in the flat in this way. If something is being searched for, or if the user has a question about his or her clothes, food stock, book stock, etc., the system can help with hints. For example, the user can be told that he was wearing glasses when he entered the flat and it can be concluded that the glasses must be inside the flat.

Appointment diaries, lists and other support aids for daily life can also be managed by the AI system via a dialogue. The system is therefore also of particular use for old and sick people or generally people who are restricted in some way in their daily lives.

By suitable evaluation of recorded data, e.g. a facial expression recognition and an evaluation of the voice pitch or further data, the system can record the mood of the user in the short term and also give corresponding indications based on this, e.g. if someone wants to start a long journey in a hurry. For example, the detected mood can be included in the evaluation that was carried out by the evaluation level in the above embodiment examples.

In this context, the detection options as well as the dialogues are not necessarily bound to the object, i.e. in this case the intelligent mirror. In order to prevent a user from having to hold lengthy conversations with the AI system in an unsuitable location, the system can therefore initiate or continue the dialogue with the user via loudspeakers, microphones and other devices distributed at appropriate locations in a flat. The components of the AI system itself can also be distributed across several modules and can be connected to each other, for example, via suitable wireless or wired communication interfaces.

For all AI systems presented here, it should preferably apply that the recorded and stored data, in particular the personal data, are strictly protected, in particular a cryptographically secured storage of data is provided. For this purpose, identification systems can also be integrated that can reliably identify the user from images, sound, but also from movement characteristics, an evaluation of speech emphasis or any other biometric characteristics. This can prevent personal information from being disclosed to a guest or other unauthorised person in the dialogue.

Further possible embodiments, which can be implemented individually or in any combination with each other and with the above embodiments, are summarised below:

For example, according to one embodiment, a method may be implemented in a system of multiple artificial learning units comprising inputting input values to at least a first artificial learning unit and a second artificial learning unit, whereupon first output values of the first artificial learning unit are obtained. Based on the output values of the first artificial learning unit, one or more modulation functions may be formed, which are then applied to one or more parameters of the second artificial learning unit. The one or more parameters may be parameters that influence the processing of input values and the obtaining of output values in the second artificial learning unit in some way. Furthermore, output values of the second artificial learning unit are obtained. These may represent, for example, modulated output values of the second unit.

In this way, two artificial learning units are coupled together to form an artificial learning system without using direct feedback of input or output values. Instead, one of the units is used to influence the function of the second unit by modulating certain functionally relevant parameters, resulting in a novel coupling that leads to different results or output values compared to conventional learning units. Furthermore, by processing input values in two coupled units, a result can be achieved in a shorter time or with a more in-depth analysis than in conventional systems, so that overall efficiency can be increased. In particular, the problem at hand is classified quickly and rapid changes are taken into account.

In an exemplary embodiment, at least one of the artificial learning units (working units and evaluation units) may comprise a neural network with a plurality of nodes, in particular one of the artificial learning units to which the modulation functions are applied. In this case, the one or more parameters may be at least one of the following: a weighting for a node of the neural network, an activation function of a node, an output function of a node, a propagation function of a node. These are essential components of a neural network that determine the processing of data in the network. Instead of defining new weights or functions for the nodes, the modulation function can be used to superimpose existing, self-learned and/or predefined functions of the modulated network, depending on the results of the first artificial learning unit. Thereby, this application of modulation functions can in particular also take place outside a training phase of the networks and thus achieve an active coupling of two or more networks in the processing of input values.

According to an exemplary embodiment, at least one, preferably each, of the artificial learning units (working and evaluation units) can be assigned a classification memory, wherein each of the artificial learning units performs a classification of the input values into one or more classes which are stored in the classification memory, wherein the classes are each structured in one or more dependent levels, and wherein a number of the classes and/or the levels in a first classification memory of the first artificial learning unit (first working/evaluation unit) is less than a number of the classes and/or the levels in a second classification memory of the second artificial learning unit (second working/evaluation unit). By making the classification memories of two coupled artificial learning units asymmetrical in this way, a parallel or also time-dependent alternating evaluation of the input values with different objectives can take place, e.g. a combination of a fast classification of the input values and a deep, slower analysis of the input values.

Alternatively or in addition to the asymmetric design of the classification memories, the complexity of the first and second artificial learning units can also be designed differently so that, for example, a first artificial learning unit (first working/evaluation unit) has a significantly lower degree of complexity than a second artificial learning unit (first working/evaluation unit). In the case of neural networks, for example, a first neural network can have significantly fewer nodes and/or layers and/or edges than a second neural network.

In a possible embodiment, the application of the at least one modulation function can cause a time-dependent superpositioning of parameters of the second artificial learning unit, wherein the at least one modulation function can comprise one of the following features: a periodic function, a step function, a function with briefly increased amplitudes, a damped oscillation function, a beat function as a superposition of several periodic functions, a continuously increasing function, a continuously decreasing function. Combinations or temporal sequences of such functions are also conceivable. In this way, relevant parameters of a learning unit can be superimposed in a time-dependent manner so that, for example, the output values "jump" into search spaces due to the modulation, which would not be reached without the superpositioning.

Optionally, the second artificial learning unit may comprise a second neural network having a plurality of nodes, wherein applying the at least one modulation function causes deactivation of at least a portion of the nodes. This type of deactivation can also be considered as a "dropout" based on the output values of the first artificial learning unit and can also provide for newly opened search areas in the classifications as well as for a reduced computational effort and thus an accelerated execution of the method.

In exemplary embodiments, the method may further comprise determining a current dominant artificial learning unit in the system, and forming overall output values of the system from the output values of the current dominant unit. In this way, the two or more artificial learning units in the system can be meaningfully coupled and synchronised.

For example, the first artificial learning unit (in particular the first working unit) can be set as the dominant unit at least until one or more output values of the second artificial learning unit (in particular the second working unit) are available. In this way, it can be ensured that the system is decision-safe at all times, i.e. that a reaction of the system is possible at all times (after a first run of the first working unit), even before a complete classification of the input values has been made by all existing artificial learning units of the system.

It is also possible to further apply a comparison of the current input values with previous input values by at least one of the artificial learning units of the system, whereby, if the comparison results in a deviation that is above a predefined input threshold, the first artificial learning unit is set as the dominant unit. In this way, it can be ensured that substantially changed input values (e.g. detection of a new situation by means of sensors) are immediately reacted to with a new analysis of the input values.

Additionally or alternatively, a comparison of current output values of the first artificial learning unit with previous output values of the first artificial unit (in particular the first working unit) may further be made, whereby, if the comparison results in a deviation that is above a predetermined output threshold, the first artificial learning unit is determined to be the dominant unit. By evaluating deviations in the output values, for example if deviating classes are present as a result compared to a previous run, changes in the input values can thus also be indirectly detected that have a certain significance and thus make a new classification meaningful.

In certain embodiments, the system may further comprise at least one timer storing one or more predetermined time periods associated with one or more of the artificial learning units, the timer being arranged to measure, for one of the artificial learning units at a time, the passage of the predetermined time period associated with that unit. Such an element forms a possibility to synchronise the different units of a system, for example, and to control when output values of a certain unit are expected or processed further. Thus, a timer can be used to define an adjustable latency time of the overall system within which a decision should be available as the overall output value of the system. This time can be, for example, a few ms, e.g. 30 or 50 ms, and can be dependent, among other things, on the existing topology of the computing units and the available computing units (processors or other data processing means).

For example, the measurement of the assigned predefined time period for one of the artificial learning units can be started as soon as this artificial learning unit is determined as the dominating unit. In this way, it can be ensured that a unit develops a solution within a predetermined time or, optionally, that the data processing is even aborted.

In one possible embodiment, the second artificial learning unit (in particular the second working unit) can be set as the dominant unit if a first time period in the timer predetermined for the first artificial learning unit has elapsed. This ensures that a reaction based on the first artificial unit is already possible before the input values are analysed by further artificial learning units, while subsequently the data is evaluated in more detail by the second unit.

In any embodiment, the input values may include, for example, one or more of the following: measured values detected by one or more sensors, data detected by a user interface, data retrieved from a memory, data received via a communication interface, data output by a computing unit. For example, it can be image data captured by a camera, audio data, position data, physical measurements such as velocities, distance measurements, resistance values, and generally any value captured by a suitable sensor. Similarly, data can be entered or selected by a user via a keyboard or screen and optionally linked to other data such as sensor data.

It is understood that the examples described above can be combined in any way. For example, in any of the embodiments described, there may also be a timer as described in connection with FIG. 4. Similarly, in all of the examples, the learning units may have classification memories as described as an example in connection with FIG. 5. All these variants are again applicable to a coupling of more than three or four artificial learning units.

The invention claimed is:

1. A method, executed in a controller of a machine, for processing input values ($X_1$) comprising sensor data detected by one or more sensors in an overall system having a working level (710) and an evaluation level (730) which are artificial learning systems, comprising a) inputting first input values (Xi (t1)) to the working level and determining first output values (OutputII) from the first input values by the working level, according to a first classification;

b) forming first situation data (Y(t3)) based on the first output values (Output11);

c) inputting the first situation data to the evaluation level and determining first assessments (Output21) by the evaluation level indicating whether or to what degree the first situation data meets predetermined first conditions;

d) influencing the determination of the first output values in the working level based on a first evaluation;

whereby steps a)-d) are carried out repeatedly;

e) inputting second input values (Xi (t2)) to the working level and determining second output values (Output12) from the second input values by the working level, according to a second classification, wherein the determination of the second output values is influenced by the first output values;

f) forming second situation data (Y(t4)) based on the second output values;

g) inputting the second situation data to the evaluation level and determining second assessments (output22) by the evaluation level indicating whether or to what degree the second situation data satisfy predetermined second conditions, the determination of the second assessments being influenced by the first assessments;

h) influencing the determination of the second output values in the working level based on the second evaluations;

whereby steps e)-h) are carried out repeatedly;

wherein the first and/or the second output values are used as overall output values (Output) of the overall system, wherein the overall output values are used as control parameters and/or state parameters of the machine wherein the determination of the first and the second output values from the first and the second input values, respectively, and the determination of the first and the second output values from the first and the second situation data, respectively, is each determined by one or more parameters, and wherein the influencing in steps d), e), g), and h) each includes a modulation of the respective one or more parameters.

2. A method according to claim 1, wherein steps a)-d) are repeatedly performed until a predetermined first time period has elapsed and/or the first output values no longer change between successive repetitions within predetermined first tolerances and/or the first evaluations indicate that the first conditions are fulfilled at least to some degree; wherein preferably the first output values are used as overall output values when this repeated performance is completed.

3. A method according to claim 1, wherein steps e) h) are repeatedly performed until a predetermined second time period has elapsed and/or the second output values no longer change between successive repetitions within predetermined second tolerances and/or the second evaluations indicate that the second conditions are fulfilled at least to some degree; wherein the second output values are used as overall output values when this repeated performance is completed.

4. A method according claim 1, comprising storing, in an overall sequence memory (760, 860), overall sequences of overall records each comprising mutually corresponding input values and/or first output values and/or first situation data and/or first evaluations and/or second output values and/or second situation data and/or second evaluations; wherein the overall records and/or the values or data comprised in the overall records are provided with respective time information and/or numbering.

5. A method according to claim 1, comprising supplementing the first and/or second conditions so that, for first and second situation data respectively, for which the first and second conditions respectively are not satisfied prior to the supplementation, the supplemented first and second conditions respectively are satisfied or at least to some degree satisfied; wherein only the second conditions are changed and the first conditions remain unchanged.

6. A method according to claim 5, wherein steps e) h) are repeatedly performed until a predetermined second time period has elapsed and/or the second output values no longer change between successive repetitions within predetermined second tolerances and/or the second evaluations indicate that the second conditions are fulfilled at least to some degree; wherein the second output values are used as overall output values when this repeated performance is completed, and wherein, when the repetition of steps e)-h) is aborted because the second time period has expired or because the second output values no longer change within the second tolerances, the second conditions are supplemented so that the situation data present at abort satisfy the supplemented second conditions.

7. A method according to claim 5 comprising storing, in an overall sequence memory (760, 860), overall sequences of overall records each comprising mutually corresponding input values and/or first output values and/or first situation data and/or first evaluations and/or second output values and/or second situation data and/or second evaluations; wherein the overall records and/or the values or data comprised in the overall records are provided with respective time information and/or numbering wherein the supplementing of the first and/or second conditions takes place based on stored total sequences for which the first or second conditions, respectively, could not be fulfilled.

8. A method according to claim 1, wherein the overall system comprises a projection level and the forming of the first and/or the second situation data is performed by the projection level.

9. A method according claim 1, wherein said second classification classifies at least one class of said first classification into a plurality of subclasses and/or wherein for at least one of said first conditions said one first condition is implied by a plurality of said second conditions.

10. A method according to claim 1, wherein the first conditions are given in the form of rules and the second conditions are given in the form of rule classifications; wherein each rule is assigned a rule classification which represents a subdivision into several levels, of the respective rule; wherein memories are provided in which the rules and the rule classifications are stored; wherein the rule classifications are subdivided into levels which are linked by means of a blockchain, wherein the rules and/or rule classifications are implemented in the form of a smart contract and/or wherein, if supplementing the first and/or second conditions so that, for first and second situation data respectively, for which the first and second conditions respectively are not satisfied prior to the supplementation, the supplemented first and second conditions respectively are satisfied or at least to some degree satisfied; wherein only the second conditions are changed and the first conditions remain unchanged, a further level of the subdivision is added when supplementing the second conditions.

11. A method according to claim 1, wherein the working level is designed in such a way that the determination of the first output values in step a) requires a shorter period of time and the determination of the second output values in step e) requires a longer period of time; and/or wherein the evaluation level is designed in such a way that the determination of the first evaluations in step c) requires a shorter period of time and the determination of the second evaluations in step g) requires a longer period of time; wherein in both cases independently of one another the longer period of time is longer than the shorter period of time by at least a factor of 2.

12. A method according to claim 1, wherein the first and second input values are given as time-continuous input signals or as time-discrete time series, wherein the first and second input values are wholly or partially identical.

13. A method according to claim 1, wherein a work plane comprises first and second artificially learning work units (810, 820); wherein said first artificial learning work unit (810) is adapted to receive said first input values (X; (t1)) and to determine said first output values;

wherein said second artificial learning work unit (820) is adapted to receive said second input values (Xi (t2)) and to determine said second output values; and wherein in the working level one or more first modulation functions (fmodu, fmod2_w) are formed based on the first output values and/or values derived therefrom, the formed one or more first modulation functions being applied to one or more parameters (foutA2, faktA2 f, −transA2, WiA2) of the second artificial learning working unit (820), wherein the one or more parameters influence the processing of input values and the obtaining of output values in the second artificial learning working unit.

14. A method according to claim 13, wherein one or more second modulation functions (fmodzi, foion_w) are formed based on the first evaluations and/or values derived therefrom, wherein the formed one or more second modulation functions are applied to one or more parameters (foutAI, −faktAI, ftransAI, WiAI) of the first artificially learning working unit (810), wherein the one or more parameters influence the processing of input values and the obtaining of output values in the first artificially learning working unit.

15. A method according to claim 13, wherein the first evaluations and/or values derived therefrom are used as evaluation input values of the first artificially learning work unit (810); and/or wherein the second evaluations and/or values derived therefrom are used as evaluation input values of the second artificially learning work unit (820).

16. A method according to claim 1, wherein the evaluation level comprises a first and a second artificially learning evaluation unit (830, 840); wherein the first artificially learning evaluation unit (830) is arranged to receive the first situation data (Y(t3)) and to determine the first evaluations; wherein the second artificially learning evaluation unit (840) is arranged to receive the second situation data (Y(t4)) and to determine the second evaluations; and wherein in the evaluation level one or more third modulation functions (fmodu, fmon_w) are formed based on the first evaluations and/or values derived therefrom, wherein the formed one or more second modulation functions are applied to one or more parameters (fouts2, faktB2, ftransB2, Wil32) of the second artificially learning evaluation unit (840), wherein the one or more parameters influence the processing of input values and the obtaining of output values in the second artificially learning evaluation unit.

17. A method according to claim 16, further comprising storing, in a first sequence memory, a first evaluation sequence of first evaluation sets comprising input values of the first evaluation unit and associated first evaluations, the first evaluation sets being provided with respective time information and/or numbering; and/or storing, in a second sequence memory (832), a second evaluation sequence of second evaluation sets comprising input values of the second evaluation unit and associated second evaluations, the second evaluation sets being provided with respective time information and/or numbering;

wherein the determination of the first and/or the second evaluations is carried out taking into account the stored first or second evaluation sequences.

18. A method according to claim 4, wherein the storing is done in cryptographically secured form; wherein respectively one blockchain is used, wherein blocks of the respective blockchain contain at least one of the first evaluation sets, the second evaluation sets and the overall sets, respectively.

19. A method according to claim 1, comprising receiving output values from another system;

forming first and/or second situation data from the received output values;

determining first and/or second evaluations by the evaluation level based on the first or second situation data formed from the received output values;

determining that the other system is compatible if the determined first and/or second evaluations indicate that the first or second conditions are respectively met.

20. A system in a controller of a machine comprising a working level (710) and an evaluation level (730) and arranged to perform the method according to claim 1;

wherein the working level is arranged to receive the input values and the evaluation level is not capable of receiving the input values.

21. The system of claim 20, wherein the working level and the evaluation level are each implemented in at least one computing unit.

22. The system according to claim 21, wherein the at least one computing unit in which the working level is implemented is separate from the at least one computing unit in which the evaluation level is implemented.

23. A system according to claim 20, further comprising a projection level and/or an overall sequence memory (760, 860).

24. A system according claim 20, wherein the working level comprises first and second artificially learning working units (810, 820) and wherein the evaluation level comprises first and second artificially learning evaluation units (830, 840);

wherein the artificially learning working units and/or evaluation units each comprise a neural network having a plurality of nodes, and wherein the one or more parameter(s) are each at least one of:

a weighting for a node of the neural network, an activation function of a node, an output function of a node, a propagation function of a node.

25. A system according to claim 24, wherein:

the first and second artificially learning working units are implemented in a first computing unit and a second computing unit, respectively, the first and second computing units being interconnected by a first interface;

the first and second artificially learning evaluation units are implemented in a third computing unit and a fourth computing unit, respectively, the third and fourth computing units being interconnected by a third interface;

the third computing unit and the first computing unit are interconnected by a second interface, wherein the second interface is arranged to form one or more modulation functions based on the first evaluations, the modulation functions being applied to one or more parameters of the first artificially learning working unit to influence processing of input values and obtaining of output values in the first artificially learning working unit; and each of the first, second, third, and fourth computing units is assigned a memory connected to or included in the respective computing unit, wherein the memory assigned to the first computing unit stores the first classification, the memory assigned to the second computing unit stores the second classification, the memory assigned to the third computing unit stores the first conditions, and the memory assigned to the fourth computing unit stores the second conditions.

* * * * *